(12) United States Patent
Tsuchiya

(10) Patent No.: US 10,901,281 B2
(45) Date of Patent: Jan. 26, 2021

(54) TRANSMISSIVE-TYPE LIQUID CRYSTAL DISPLAY DEVICE AND ELECTRONIC APPARATUS

(71) Applicant: SEIKO EPSON CORPORATION, Tokyo (JP)

(72) Inventor: Yutaka Tsuchiya, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 60 days.

(21) Appl. No.: 16/258,760

(22) Filed: Jan. 28, 2019

(65) Prior Publication Data

US 2019/0235328 A1  Aug. 1, 2019

(30) Foreign Application Priority Data

Jan. 29, 2018 (JP) ................................ 2018-01218 8

(51) Int. Cl.

| G02F 1/1362 | (2006.01) |
|---|---|
| G02F 1/1368 | (2006.01) |
| G02F 1/1337 | (2006.01) |
| G02F 1/1335 | (2006.01) |

(52) U.S. Cl.
CPC ...... *G02F 1/136209* (2013.01); *G02F 1/1368* (2013.01); *G02F 1/133526* (2013.01); *G02F 1/133723* (2013.01); *G02F 1/136286* (2013.01); *G02F 2201/123* (2013.01); *G02F 2203/01* (2013.01)

(58) Field of Classification Search
CPC ............. G02B 3/0056; G02F 1/133526; G02F 1/136209
See application file for complete search history.

(56) References Cited

U.S. PATENT DOCUMENTS

2015/0041833 A1* 2/2015 Nimura ............. H01L 29/78633
257/88

FOREIGN PATENT DOCUMENTS

| JP | 2002-091339 A |   | 3/2002 |
|---|---|---|---|
| JP | 2011158556 A | * | 8/2011 |
| JP | 2013-073181 A |   | 4/2013 |
| JP | 2013073181 A | * | 4/2013 |
| JP | 2016080956 A | * | 5/2016 |

* cited by examiner

*Primary Examiner* — Alexander P Gross
(74) *Attorney, Agent, or Firm* — Oliff PLC

(57) ABSTRACT

A transmissive-type liquid crystal display device includes a first substrate, a second substrate, and a liquid crystal layer. The first substrate includes a base material, a pixel electrode, a light-shielding body, a first insulator that overlaps the light-shielding body in a plan view and is disposed between the base material and the pixel electrode, a second insulator that overlaps the pixel electrode in the plan view and is disposed in contact with the first insulator, and a transmissive lens member that overlaps the pixel electrode in the plan view, is disposed between the base material and the second insulator, and has a surface on the base material side including a convex lens surface. The second insulator has a refractive index greater than a refractive index of the first insulator. A surface of the second insulator on the pixel electrode side includes a concave lens surface.

5 Claims, 14 Drawing Sheets

TRANSMISSIVE-TYPE LIQUID CRYSTAL DISPLAY DEVICE AND ELECTRONIC APPARATUS

BACKGROUND

1. Technical Field

The present invention relates to a transmissive-type liquid crystal display device and an electronic apparatus.

2. Related Art

A liquid crystal display device has been typically used as a light bulb in a liquid crystal projector.

As described in JP-A-2013-73181, for example, examples of the liquid crystal display device include a liquid crystal device including an element substrate that includes a pixel electrode and a switching element, a counter substrate that includes a common electrode, and a liquid crystal layer that is sandwiched between the element substrate and the counter substrate and includes liquid crystal molecules. The element substrate provided in the liquid crystal device includes a pixel region through which light passes and an inter-pixel region in which passage of light is shielded. The pixel electrode having transmissivity and an insulating layer having transmissivity are disposed in the pixel region. The switching element and a plurality of light-shielding layers disposed so as to sandwich the switching element with the insulating layer having transmissivity are disposed in the inter-pixel region. A malfunction due to application of light to the switching element can be prevented by providing the light-shielding layer.

However, the light-shielding layer shields a part of light incident on the liquid crystal device. As a result, utilization efficiency of light of the liquid crystal device decreases. Thus, the utilization efficiency of light is increased by using a microlens to collect light in the pixel region and reduce light shielded in the inter-pixel region in the liquid crystal device described in JP-A-2013-73181.

However, intensity of light applied to the liquid crystal molecules is increased because the light passing through the microlens is collected in the liquid crystal layer in the liquid crystal device described in JP-A-2013-73181. As a result, the liquid crystal molecules are deteriorated, and reliability of light resistance of the liquid crystal display device decreases.

Further, the switching element is sandwiched between the plurality of light-shielding layers and the insulating layer having transmissivity in the liquid crystal device described in JP-A-2013-73181, and the insulating layer is formed of the same material as a material for the insulating layer disposed in the pixel region. Thus, a part of light passing through the pixel region may be incident on the insulating layer in the inter-pixel region. As a result, the utilization efficiency of light may decrease.

SUMMARY

In the invention, one solution of the problem is to provide a transmissive-type liquid crystal display device capable of increasing utilization efficiency of light with excellent reliability of light resistance and an electronic apparatus including the transmissive-type liquid crystal display device.

A transmissive-type liquid crystal display device according to one aspect of the invention includes a first substrate, a second substrate disposed away from the first substrate, and a liquid crystal layer that is disposed between the first substrate and the second substrate and includes liquid crystal molecules, the transmissive-type liquid crystal display device allowing light incident on the first substrate to be emitted from the second substrate. The first substrate includes a base material having transmissivity, a light-shielding body disposed away from the base material and disposed in a light-shielding region in a grid pattern, a pixel electrode disposed in an opening region surrounded by the light-shielding region in a plan view seen from a thickness direction of the first substrate, a first insulator that overlaps the light-shielding body in the plan view, is disposed between the base material and the pixel electrode, and has transmissivity, a second insulator that overlaps the pixel electrode in the plan view, is disposed in contact with the first insulator between the base material and the pixel electrode, and has transmissivity, and a lens member that overlaps the pixel electrode in the plan view, is disposed between the base material and the second insulator, has a surface on the base material side including a convex lens surface, and has transmissivity. The second insulator has a refractive index greater than a refractive index of the first insulator. A surface of the second insulator on the pixel electrode side includes a concave lens surface.

According to one aspect of the invention, light refracted by the convex lens surface of the lens member is refracted again by the concave lens surface of the second insulator, and can thus be in parallel or substantially parallel with an optical axis of incident light incident on the transmissive-type liquid crystal display device. For this reason, condensation of light can be reduced in the liquid crystal layer, such that an increase in intensity of light applied to the liquid crystal molecules can be reduced. The second insulator has a refractive index greater than a refractive index of the first insulator, and can thus function as a waveguide. For this reason, the convex lens surface of the lens member can take more light incident on the second insulator into the second insulator, such that the light that has been taken in can be efficiently guided to the pixel electrode. Therefore, utilization efficiency of light can be increased while reducing a decrease in reliability of light resistance due to deterioration of the liquid crystal molecules in comparison with a known transmissive-type liquid crystal display device.

In one aspect of the present invention, a third insulator is preferably provided that is disposed in contact with the concave lens surface and the pixel electrode between the second insulator and the pixel electrode, has a refractive index lower than a refractive index of the second insulator, and has transmissivity.

According to this aspect, an influence of, for example, air on interface reflection of light can be reduced in comparison with a case where there is space between the second insulator and the pixel electrode, and thus a transmission loss of light can be reduced. For this reason, more light can be guided to the pixel electrode, and the utilization efficiency of light can be further increased.

In one aspect of the invention, the lens member is preferably larger than the second insulator and preferably overlaps the second insulator in the plan view.

According to this aspect, more light can be taken into the second insulator in comparison with a case where the lens member is smaller than the second insulator in the plan view, for example. For this reason, the utilization efficiency of light can be further increased.

In one aspect of the invention, the concave lens surface of the second insulator preferably has a curvature greater than a curvature of the convex lens surface of the lens member.

According to this aspect, when the lens member is larger than the second insulator in the plan view as described above, light passing through the concave lens surface can be substantially more parallel to the optical axis of the incident light incident on the transmissive-type liquid crystal display device by increasing a curvature of the concave lens surface to be greater than a curvature of the convex lens surface in comparison with a case where the curvature is equal.

In one aspect of the invention, the second insulator preferably has a refractive index greater than a refractive index of the lens member.

According to this aspect, when the lens member is larger than the second insulator in the plan view as described above, light passing through the concave lens surface can be substantially more parallel to the optical axis of the incident light incident on the transmissive-type liquid crystal display device in comparison with a case where the second insulator has a refractive index equal to a refractive index of the lens member, for example.

In one aspect of the invention, a fourth insulator that overlaps the pixel electrode in the plan view, has a refractive index lower than a refractive index of both the second insulator and the lens member, and has transmissivity is preferably disposed between the second insulator and the lens member.

According to this aspect, a planar shape of the convex lens surface of the lens member can be easily made to be larger than a planar shape of the concave lens surface of the second insulator in comparison with a case where the second insulator directly contacts the lens member. For this reason, light shielded by the light-shielding body can be further reduced. In addition, a transmission loss of light can be reduced in comparison with a case where there is a gap between the second insulator and the lens member. For this reason, more light can be guided to the pixel electrode. Therefore, the utilization efficiency of light can be further increased with the fourth insulator.

In one aspect of the invention, the second insulator and the lens member are preferably integrally formed.

According to this aspect, the transmissive-type liquid crystal display device having high utilization efficiency of light while reducing a decrease in reliability of light resistance can be achieved with a simple configuration in comparison with a case where the second insulator and the lens member are separate. Further, the manufacturing process of the first substrate can be more facilitated.

In one aspect of the invention, the light-shielding body is preferably contained in the first insulator in the plan view.

According to this aspect, the light-shielding body is not exposed from the second insulator, and thus light can be prevented from being reflected diffusely by an end surface of the light-shielding body.

An electronic apparatus according to one aspect of the invention preferably includes the transmissive-type liquid crystal display device according to one aspect of the invention.

In one aspect of the invention, the transmissive-type liquid crystal display device having high utilization efficiency of light while reducing a decrease in reliability of light resistance is provided, and thus the electronic apparatus having a high degree of reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, suitable exemplary embodiments according to the invention will be described with reference to accompanying drawings. Note that, dimensions and scale of each component appropriately differ from actual dimensions and scale in drawings, and some components are schematically illustrated to facilitate understanding. In addition, the scope of the invention is not limited to these embodiments unless a description of the effect that the invention is specifically limited is made in the description below.

1. Liquid Crystal Display Device

First, a transmissive-type liquid crystal display device in the invention will be described by taking, as an example, an active matrix liquid crystal display device including a thin film transistor (TFT) as a switching element. The liquid crystal display device can be suitably used as a light modulation element (light bulb) of a projection-type display apparatus described later.

First Exemplary Embodiment

1(a). Basic Configuration

Figure 1:
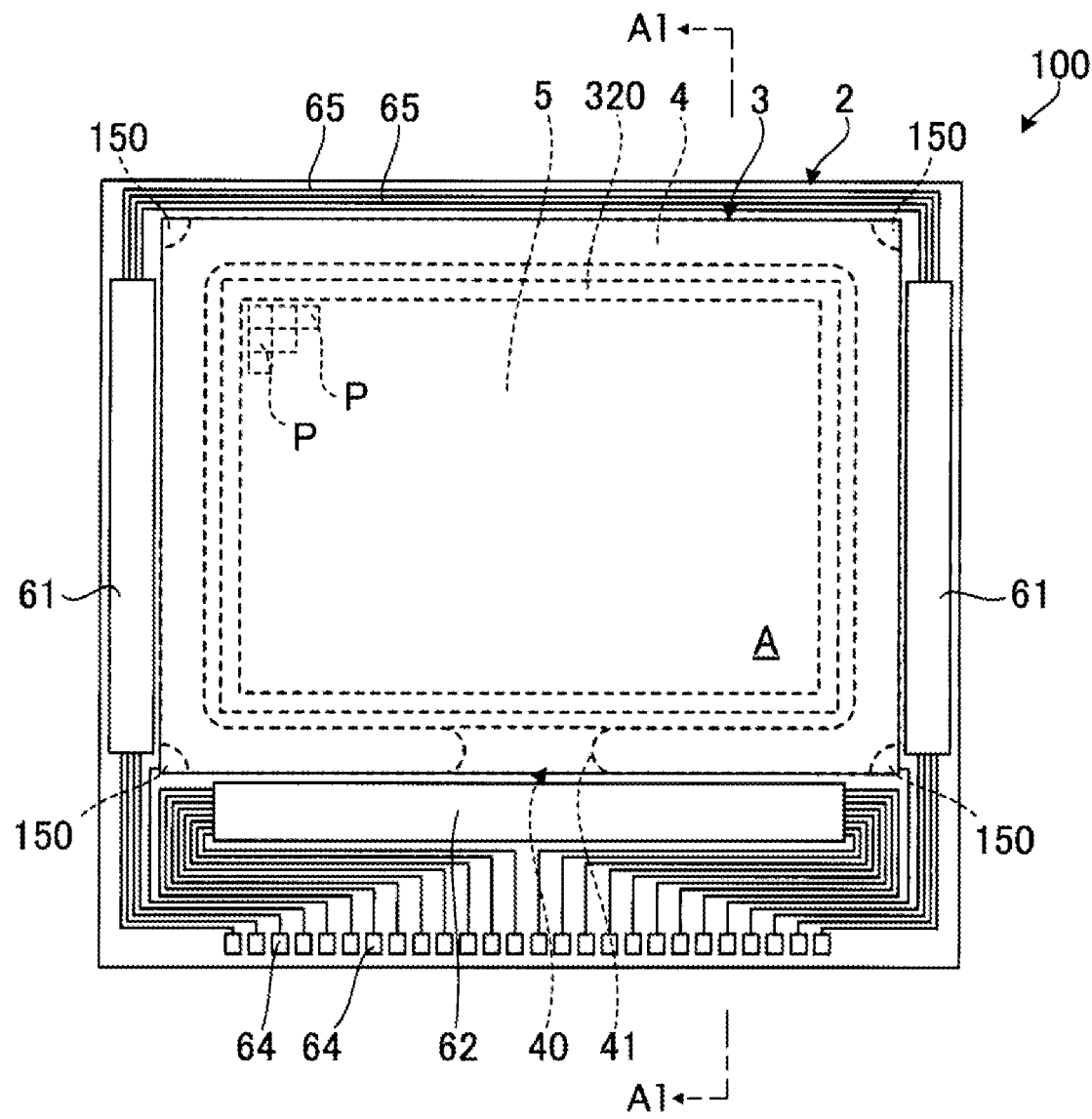
FIG. 1 illustrates a schematic plan view of a liquid crystal display device in a first exemplary embodiment.
Figure 2:
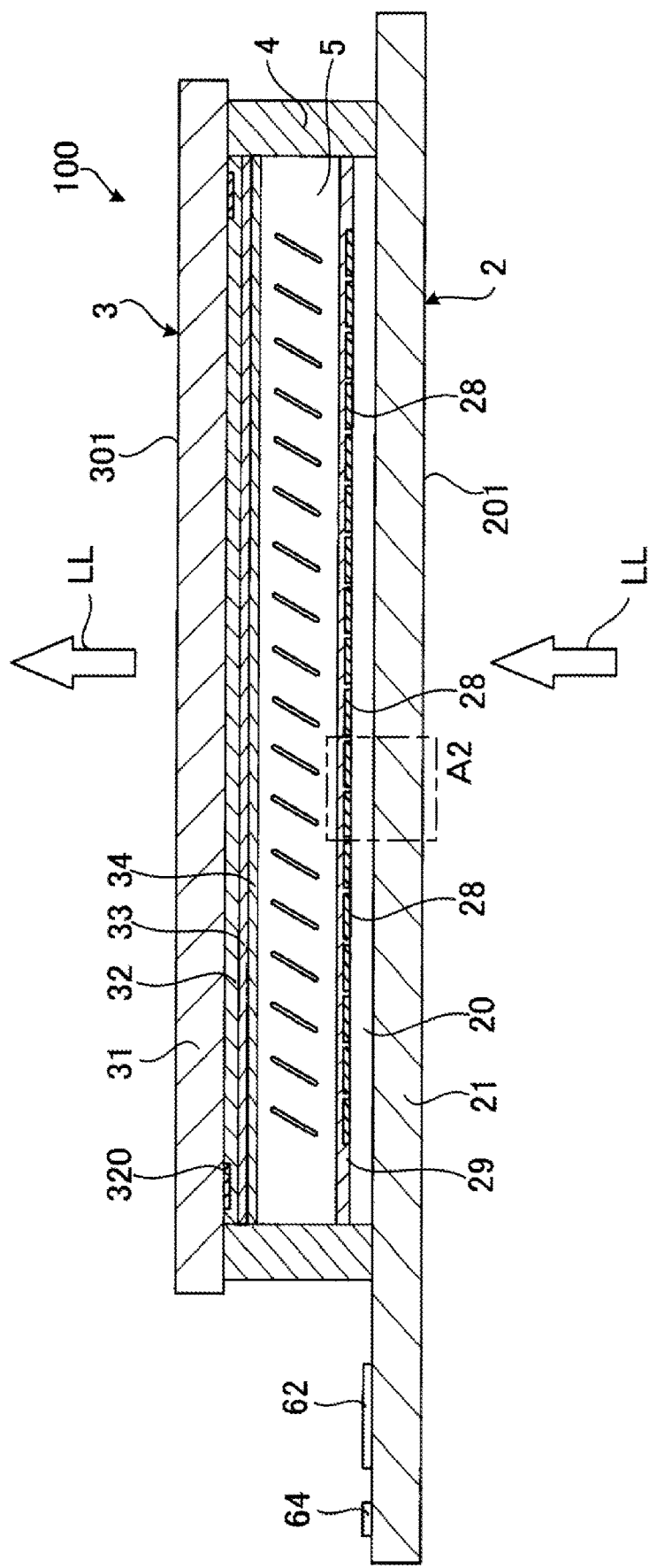
FIG. 2 is a cross-sectional view illustrating the liquid crystal display device illustrated in FIG. 1.
Figure 3:
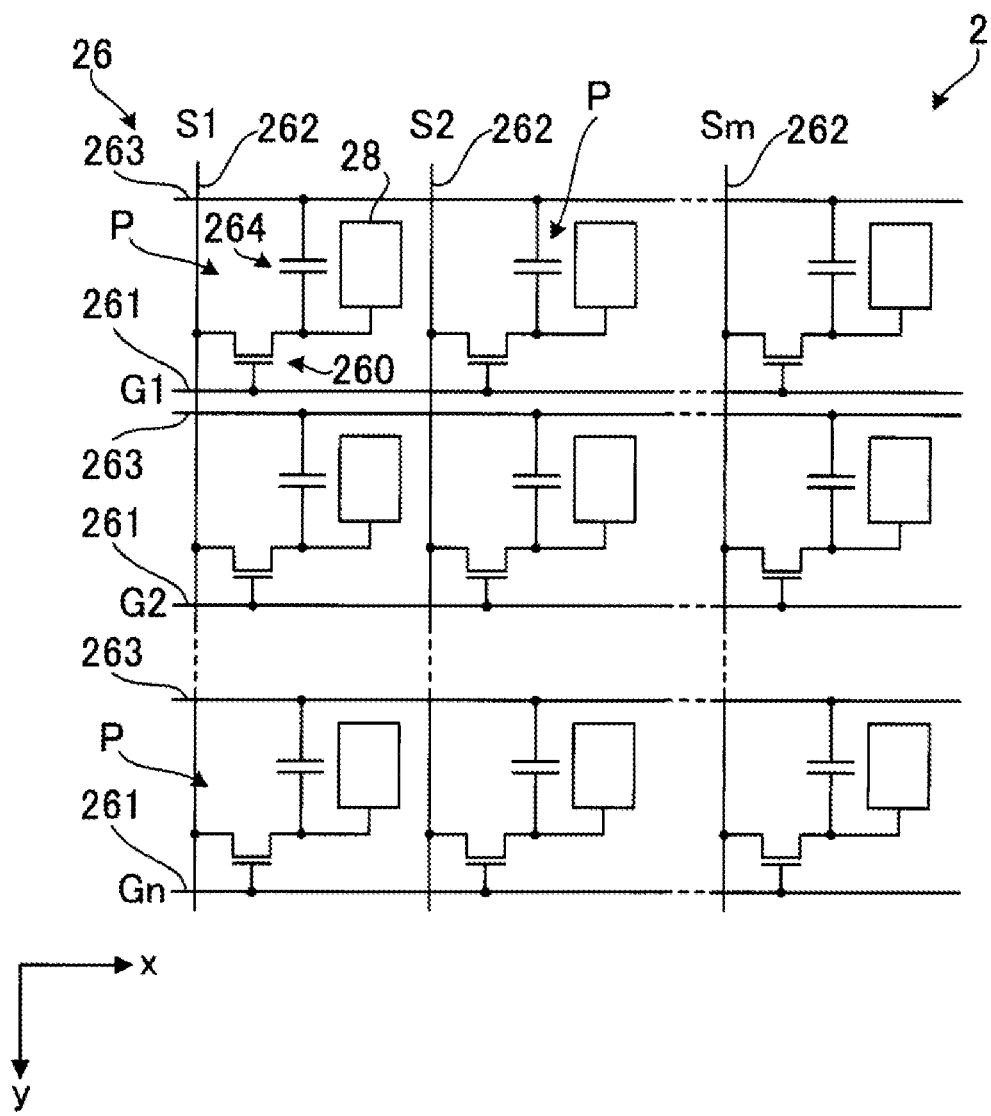
FIG. 3 is a diagram of an equivalent circuit illustrating an electrical configuration of an element substrate.

FIG. 1 is a schematic plan view of a liquid crystal display device in a first exemplary embodiment. FIG. 2 is a cross-sectional view of the liquid crystal display device illustrated in FIG. 1, and is a cross-sectional view taken along with a line A1-A1 in FIG. 1. FIG. 3 is a diagram of an equivalent circuit illustrating an electrical configuration of an element substrate.

A liquid crystal display device 100 illustrated in FIGS. 1 and 2 includes an element substrate 2 (first substrate) having transmissivity, a counter substrate 3 (second substrate) that is disposed opposite to the element substrate 2 and has transmissivity, a frame-shaped sealing member 4 disposed between the element substrate 2 and the counter substrate 3, and a liquid crystal layer 5 surrounded by the element substrate 2, the counter substrate 3, and the sealing member 4. In the exemplary embodiment, the liquid crystal display device 100 is a transmissive-type liquid crystal display device, and modulates light LL incident on the element substrate 2 side and emits the light LL from the counter substrate 3 as illustrated in FIG. 2.

Note that, the liquid crystal display device 100 has a rectangular shape in a plan view seen from a thickness direction of the element substrate 2 as illustrated in FIG. 1, but a planar shape of the liquid crystal display device 100 is not limited to the rectangular shape and may be a round shape and the like. In addition, transmissivity refers to transmissivity for visible light in this specification. The light LL is visible light. Hereinafter, incident light incident on the liquid crystal display device 100, light passing through the liquid crystal display device 100, and emitted light emitted from the liquid crystal display device 100 may not be distinguished from one another and may be referred to as the light LL.

Element Substrate

As illustrated in FIG. 1, the element substrate 2 has such a size that contains the counter substrate 3 in the plan view. As illustrated in FIG. 2, the element substrate 2 includes a base material 21, a light-guiding layer 20, a plurality of pixel electrodes 28, and an alignment film 29. The base material 21, the light-guiding layer 20, the plurality of pixel electrodes 28, and the alignment film 29 are laminated in this order. The alignment film 29 is located to be closest to the liquid crystal layer 5 side.

Figure 4:
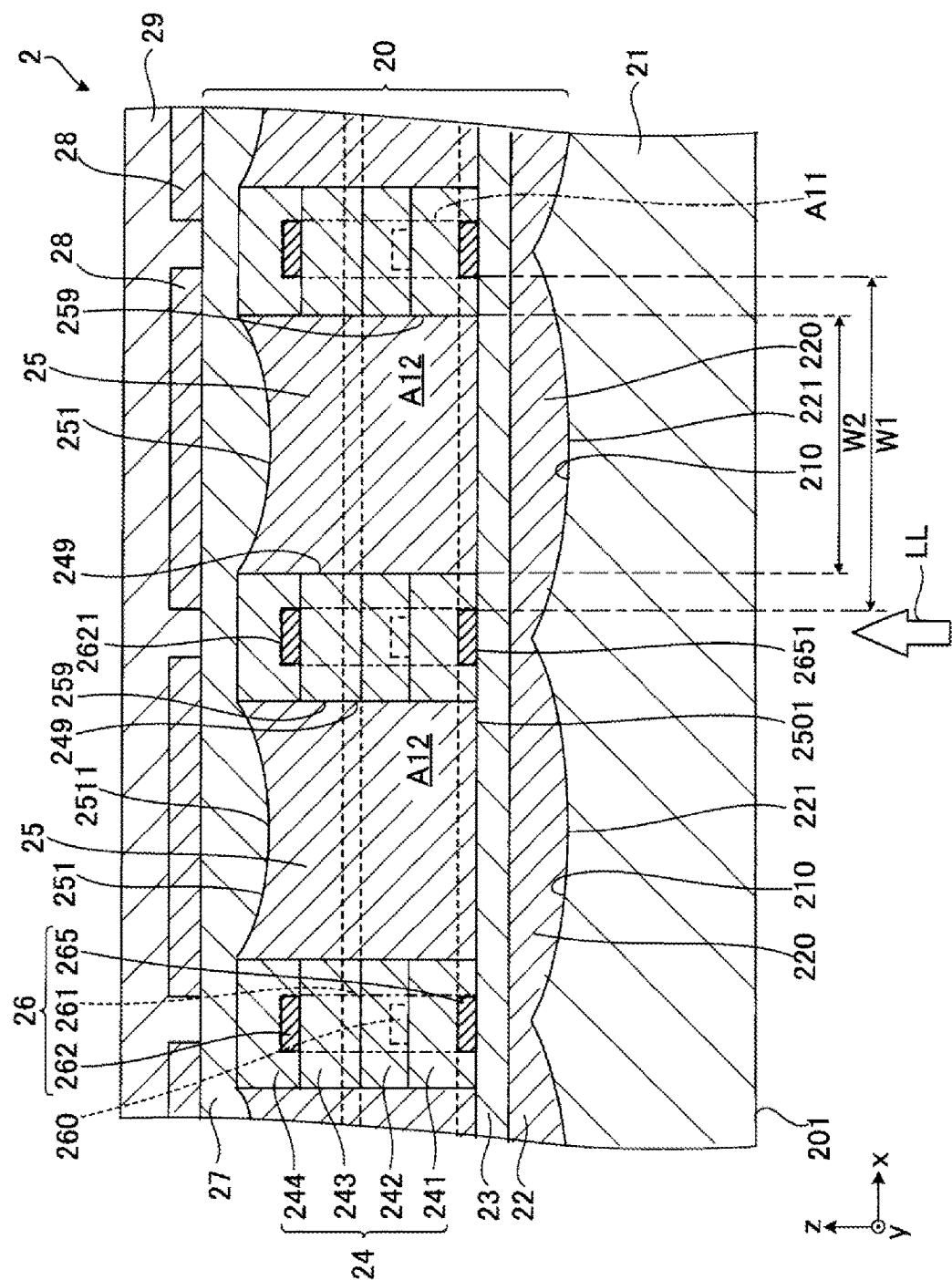
FIG. 4 illustrates an enlarged cross-sectional view of the element substrate provided in the liquid crystal display device illustrated in FIG. 1.

The base material 21 has a substantially flat plat shape and is formed of a transmissive member having insulating properties, such as glass and quartz, for example. The base material 21 has an incident surface 201 on which the light LL is incident. The plurality of pixel electrodes 28 are formed of a transparent electrode material, such as indium tin oxide (ITO) and indium zinc oxide (IZO), for example. The alignment film 29 has a function of aligning liquid crystal molecules of the liquid crystal layer 5. Examples of a structural material for the alignment film 29 include polyimide and silicon oxide. Note that, as described later, the light-guiding layer 20 has a function of guiding the light LL to the liquid crystal layer 5, and includes a microlens array 22, an insulating layer 23 (fourth insulator), a first insulator 24, a plurality of second insulators 25, and an insulating layer 27 (third insulator), as illustrated in FIG. 4. As described later, the light-guiding layer 20 includes a light-shielding body 26 including a scan line 261, a data line 262, a capacitive line 263, and a light-shielding layer 265, and a TFT 260 (see FIGS. 3 and 4).

Counter Substrate

As illustrated in FIG. 2, the counter substrate 3 includes a base material 31, an insulating layer 32, a common electrode 33, and an alignment film 34. The base material 31, the insulating layer 32, the common electrode 33, and the alignment film 34 are laminated in this order. The alignment film 34 is located to be closest to the liquid crystal layer 5 side.

The base material 31 has a substantially flat plat shape and is formed of a transmissive member having insulating properties, such as glass and quartz, for example. The base material 31 has an emission surface 301 from which the light LL is emitted. The common electrode 33 is laminated on the base material 31 with the insulating layer 32 therebetween. The common electrode 33 is formed of a transparent electrode material, such as ITO and IZO, for example. The alignment film 34 has a function of aligning the liquid crystal molecules of the liquid crystal layer 5. Examples of a structural material for the alignment film 34 include polyimide and silicon oxide.

As illustrated in FIGS. 1 and 2, a frame-shaped peripheral partition 320 formed of a metal material having light-shielding properties and the like is provided inside the sealing member 4 of the counter substrate 3. The peripheral partition 320 is formed so as to be embedded in the insulating layer 32. The inside of the peripheral partition 320 constitutes a display region A in which an image and the like are displayed. The peripheral partition 320 prevents unnecessary stray light from being incident on the display region A, which allows a high contrast in display to be secured. The display region A includes a plurality of pixels P arranged in matrix. A conductive material 150 is provided near each of four corners of the counter substrate 3 to establish electrical communication between the element substrate 2 and the counter substrate 3.

Sealing Member

The sealing member 4 is formed of an adhesive agent and the like including various hardening resin such as epoxy resin, for example. The sealing member 4 adheres to each of the element substrate 2 and the counter substrate 3. The liquid crystal layer 5 is provided in a region surrounded by the sealing member 4, the element substrate 2, and the counter substrate 3. An inlet 41 is formed in a lower portion of the sealing material 4 in FIG. 1 to allow a liquid crystal material including liquid crystal molecules to be injected through the inlet 41. The inlet 41 is sealed with a sealing material 40 formed of various resin materials.

Liquid Crystal Layer

The liquid crystal layer 5 includes liquid crystal molecules having positive or negative dielectric anisotropy. The liquid crystal layer 5 is sandwiched between the element substrate 2 and the counter substrate 3 in such a way that the liquid crystal molecules contact both of the alignment film 29 and the alignment film 34. The liquid crystal layer 5 enables a gradation display with the light LL being modulated by changing the alignment of the liquid crystal molecules depending on a level of applied voltage.

As illustrated in FIG. 1, two scan line drive circuits 61 and one data line drive circuit 62 are provided in an outer edge portion of a surface of the element substrate 2 on the counter substrate 3 side. In the illustrated example, the two scan line drive circuits 61 are disposed on the left side and the right side of the element substrate 2 in FIG. 1. The data line drive circuit 62 is disposed on the lower side of the element substrate 2 in FIG. 1. A plurality of external terminals 64 are also provided in the outer edge portion of the surface of the element substrate 2 on the counter substrate 3 side. Wires 65 drawn from each of the scan line drive circuits 61 and the data line drive circuit 62 are connected to the external terminals 64.

The basic configuration of the liquid crystal display device 100 is described above. A drive mode of the liquid crystal display device 100 is not particularly limited, and examples of the drive mode include a twisted nematic (TN) mode and a vertical alignment (VA) mode, for example.

1(b). Electrical Configuration

Next, an electrical configuration of the liquid crystal display device 100 will be simply described. FIG. 3 is a diagram of an equivalent circuit illustrating an electrical configuration of the element substrate provided in the liquid crystal display device illustrated in FIG. 1. FIG. 3 illustrates an x-axis and a y-axis orthogonal to each other for the sake of description.

As illustrated in FIG. 3, n scan lines 261, m data lines 262, and n capacitive lines 263 are formed in the element substrate 2. Note that, n and m are integers of two or greater. The TFT 260 as a switching element is provided at each intersection of the n scan line 261 and the m data line 262. The n scan lines 261, the m data lines 262, and the n capacitive lines 263 are made of metal such as aluminum and constitute the light-shielding body 26 that shields the light LL.

The n scan lines 261 are aligned at regular intervals in the y direction and extend in the x direction. The scan line 261 is electrically connected to a gate electrode of the TFT 260. The n scan lines 261 are electrically connected to the scan line drive circuits 61 (see FIG. 1). Scan signals G1, G2, . . . , and Gn are successively supplied from the scan line drive circuits 61 to the n scan lines 261.

The m data lines 262 are aligned at regular intervals in the x direction and extend in the y direction. The data line 262 is electrically connected to a source electrode of the TFT 260. The m data lines 262 are electrically connected to the data line drive circuit 62 illustrated in FIG. 1. Image signals S1, S2, . . . , and Sm are successively supplied from the data line drive circuit 62 (see FIG. 1) to the m data lines 262.

The n scan lines 261 and the m data lines 262 are insulated from each other and are formed in a grid pattern in the plan view. A region surrounded by the two adjacent scan lines 261 and the two adjacent data lines 262 corresponds to the pixel P. One pixel electrode 28 is formed in one pixel P. Note that, a drain electrode of the TFT 260 is electrically connected to the pixel electrode 28.

The n capacitive lines 263 are aligned at regular intervals in the y direction and extend in the x direction. The n capacitive lines 263 are insulated from and formed at a distance from the plurality of data lines 262 and the plurality of scan lines 261. A fixed potential such as a ground potential is applied to the capacitive line 263. A storage capacitance 264 is provided in parallel with a liquid crystal capacitance between the capacitive line 263 and the pixel electrode 28 to prevent a leak of an electric charge held in the liquid crystal capacitance.

The scan signals G1, G2, . . . , and Gn successively become active. When the n scan lines 261 are successively selected, the TFT 260 connected to the selected scan line 261 is placed into an ON state. Then, the image signals S1, S2, . . . , and Sm having magnitude according to a gradation that needs to be displayed via the m data lines 262 are taken into the pixel P corresponding to the selected scan line 261 and applied to the pixel electrode 28. In this way, a voltage according to a gradation that needs to be displayed is applied to the liquid crystal capacitance formed between the pixel electrode 28 and the common electrode 33 provided in the counter substrate 3 illustrated in FIG. 2, and thus the alignment of the liquid crystal molecules changes according to the applied voltage. The storage capacitance 264 holds the applied voltage. The light LL is modulated by the change in the alignment of the liquid crystal molecules, which enables a gradation display.

1(c). Configuration of Element Substrate

Figure 5:
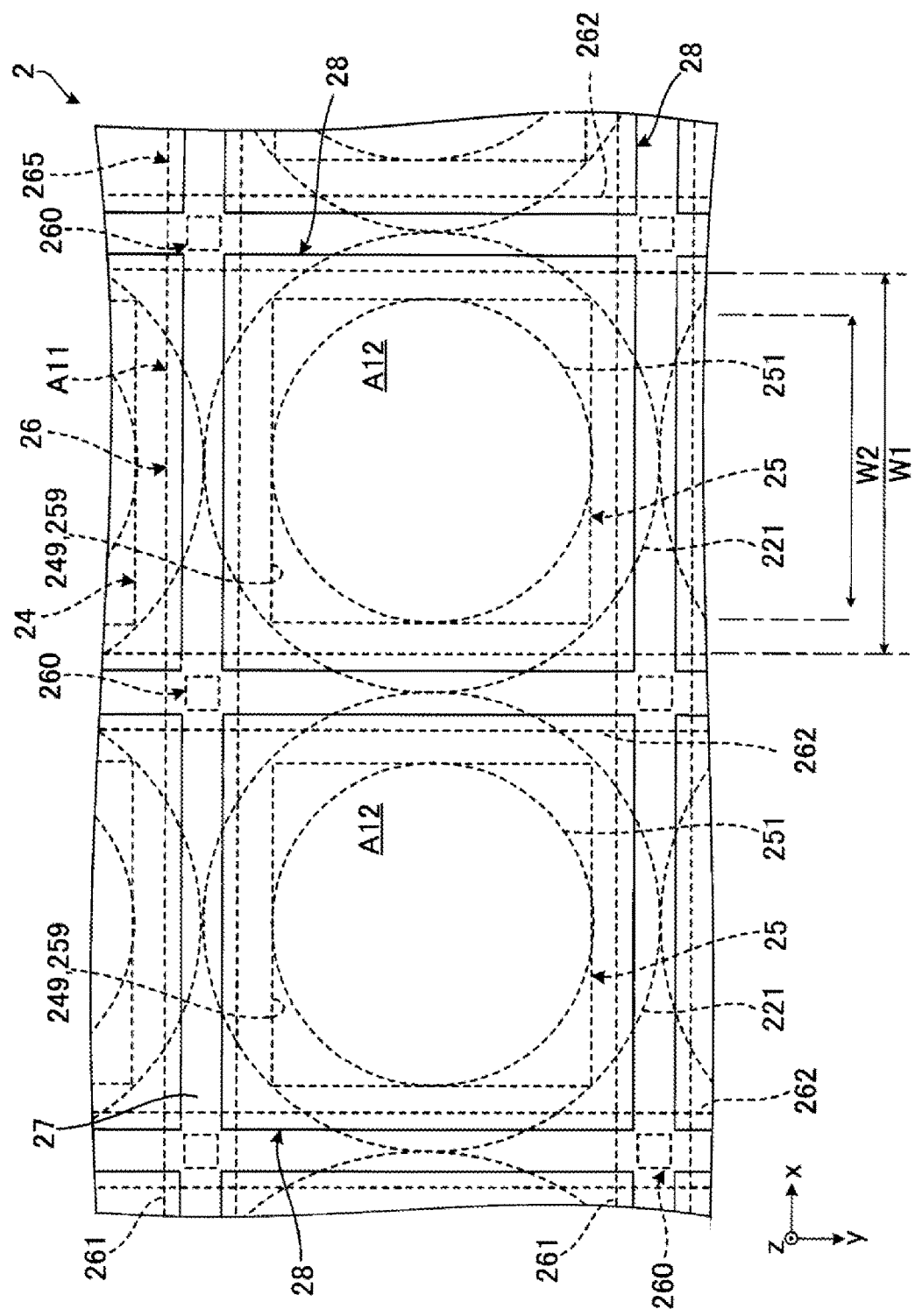
FIG. 5 illustrates a plan view of the element substrate illustrated in FIG. 4.

Next, a detailed configuration of the element substrate 2 will be described. FIG. 4 is an enlarged cross-sectional view of the element substrate provided in an electro-optical device illustrated in FIG. 1 and an enlarged view of a region A2 in FIG. 2. FIG. 5 is a plan view of the element substrate illustrated in FIG. 4. Note that, FIG. 5 does not illustrate the alignment film 29. FIGS. 4 and 5 each illustrate the x-axis, the y-axis, and a z-axis orthogonal to one another for the sake of description.

As illustrated in FIG. 4, the element substrate 2 includes the base material 21, the light-guiding layer 20, the plurality of pixel electrodes 28, and the alignment film 29. The light-guiding layer 20 includes the microlens array 22, the insulating layer 23 (fourth insulator), the first insulator 24, the plurality of second insulators 25, and the insulating layer 27 (third insulator). The light-guiding layer 20 further includes the TFT 260 and the light-shielding body 26.

Base Material

As illustrated in FIG. 4, the base material 21 is a member having transmissivity and having a substantially plate shape, and has a plurality of recessed portions 210 being recessed in a hemispherical shape. The plurality of recessed portions 210 are formed in a surface opposite to the incident surface 201 and arranged in matrix in the plan view. Examples of a structural material for the base material 21 include a glass material and a resin material.

Microlens Array

The microlens array 22 having transmissivity is laminated on the base material 21. The microlens array 22 includes a plurality of lens members 220 (microlenses) each having a hemispherical protruding portion corresponding to the shape of the recessed portions 210. A convex lens surface 221 of the lens member 220 contacts the surface in which the recessed portion 210 is formed. The lens member 220 is a spherical lens. Examples of a structural material for the microlens array 22 include insulating materials having transmissivity, such as silicon oxynitride, silicon nitride, and aluminum oxide.

Insulating Layer

The insulating layer 23 having transmissivity is laminated on the microlens array 22. The insulating layer 23 has a refractive index lower than a refractive index of the microlens array 22. Examples of a structural material for the insulating layer 23 include insulating materials having transmissivity, such as silicon oxide. Note that, a surface of the insulating layer 23 opposite to the microlens array 22 is substantially flat.

First Insulator

The first insulator 24 having transmissivity is laminated on the microlens array 22. As illustrated in FIGS. 4 and 5, the first insulator 24 has a grid pattern in the plan view and has a plurality of openings 249. As illustrated in FIG. 4, the first insulator 24 has a laminated body in which a plurality of insulating layers 241, 242, 243, and 244 are laminated. The first insulator 24 has a refractive index smaller than a refractive index of the microlens array 22, and has a refractive index equal to a refractive index of the insulating layer 23 in the exemplary embodiment. Examples of a structural material for the first insulator 24 include insulating materials having transmissivity, such as silicon oxide. Note that, the same material or different materials may be used for the respective insulating layers 241, 242, 243, and 244.

Light-Shielding Body and TFT

As illustrated in FIG. 4, the TFT 260 and the light-shielding body 26 are formed so as to be embedded in the first insulator 24. In other words, as illustrated in FIGS. 4 and 5, the TFT 260 and the light-shielding body 26 each overlap the first insulator 24 and contained in the first insulator 24 in the plan view. As described above, the light-shielding body 26 includes the scan line 261, the data line 262, the capacitive line 263, and the light-shielding layer 265. FIGS. 4 and 5 do not illustrate the capacitive line 263.

Herein, the light-shielding body 26 includes a light-shielding region A11 having light-shielding properties. In other words, the light-shielding body 26 is provided in the light-shielding region A11. The light-shielding region A11 has a grid pattern corresponding to the shape of the first insulator 24 in the plan view. Specifically, the light-shielding region A11 has a plurality of linear shapes along the x-axis direction and a plurality of linear shapes along the y-axis direction in the plan view (see FIG. 5). Note that, as illustrated in FIG. 4, a range of the light-shielding region A11 in the z-axis direction is a range from a surface 2651 of the light-shielding layer 265 on the base material 21 side to a surface 2621 of the data line 262 on the insulating layer 27 side. The second insulator 25 described later is provided in each of a plurality of opening regions A12 surrounded by the light-shielding region A11. The opening region A12 has a width W1 greater than a width W2 of an inner wall surface forming the opening 249 of the first insulator 24.

The light-shielding layer 265 is formed of a member having light-shielding properties for the light LL. As illustrated in FIG. 5, the light-shielding layer 265 has a grid pattern corresponding to the shape of the first insulator 24 in the plan view. Specifically, the light-shielding layer 265 has a plurality of linear shapes along the x-axis direction and a plurality of linear shapes along the y-axis direction in the plan view. As illustrated in FIG. 4, the light-shielding layer 265 is provided on the insulating layer 23 and covered by the insulating layer 241. Examples of a structural material for the light-shielding layer 265 include polysilicon, metal, metal silicide, and a metallic compound. Note that, the light-shielding layer 265 does not have a function as wiring in the exemplary embodiment, but the light-shielding layer 265 may have a function as wiring.

As illustrated in FIG. 5, the plurality of scan lines 261 each extend along the x-axis direction and aligned at regular intervals. Note that, the scan line 261 has a width equal to a width of the light-shielding layer 265 described above in the illustrated drawing. As illustrated in FIG. 4, the scan line 261 is provided on the insulating layer 242 and covered by the insulating layer 243. Examples of a structural material for the scan line 261 include metal, metal silicide, and a metallic compound.

As illustrated in FIG. 5, the plurality of data lines 262 each extend along the y-axis direction and aligned at regular intervals. Note that, the scan line 261 has a width equal to a width of the light-shielding layer 265 described above in the illustrated drawing. As illustrated in FIG. 4, the data line 262 is provided on the insulating layer 243 and covered by the insulating layer 244. Examples of a structural material for the data line 262 include metal, metal silicide, and a metallic compound.

As illustrated in FIG. 4, the plurality of TFTs 260 are disposed between the light-shielding layer 265 and the scan line 261. The TFTs 260 overlap the light-shielding layer 265 and the scan line 261 and are contained in them in the plan view. The TFTs 260 are provided on the insulating layer 241 and covered by the insulating layer 242. Note that, as illustrated in FIG. 5, the TFT 260 is located at a lattice point of the light-shielding layer 265 having a grid pattern in the plan view. As described above, the TFTs 260 are disposed between the light-shielding layer 265 and the scan line 261 and contained in them in the plan view, such that the light LL can be prevented or reduced from being incident on the TFTs 260.

Second Insulator

Each of the second insulators 25 having transmissivity is disposed in contact with the first insulator 24 in the opening region A12. In other words, each of the plurality of openings 249 in the first insulator 24 is filled with the second insulator 25 having transmissivity. The second insulator 25 has a refractive index greater than a refractive index of the first insulator 24. Thus, the light LL can be reflected by an interface 259 between the second insulator 25 and the first insulator 24 and then transmitted through the second insulator 25. In other words, the second insulator 25 can function as a waveguide that transmits the light LL. Note that, as illustrated in FIG. 4, the interface 259 is substantially vertical to the thickness direction of the element substrate 2 and is identical to or close to an optical axis direction of the light LL. Examples of a structural material for the second insulator 25 include insulating materials having transmissivity, such as silicon oxynitride, silicon nitride, and aluminum oxide. In the exemplary embodiment, the second insulator 25 has a refractive index equal to a refractive index of the microlens array 22 and greater than a refractive index of the insulating layer 23.

A surface of the second insulator 25 on the insulating layer 27 side includes a concave lens surface 251 having a spherical shape. The concave lens surface 251 is a spherical lens. In the exemplary embodiment, the surface of the second insulator 25 on the insulating layer 27 side includes the concave lens surface 251 in almost the entire region. As illustrated in FIG. 5, the concave lens surface 251 is smaller than the convex lens surface 221 described above and contained in the convex lens surface 221 in the plan view. The concave lens surface 251 has a curvature greater than a curvature of the convex lens surface 221.

Insulating Layer

As illustrated in FIG. 4, the insulating layer 27 having transmissivity is provided on the first insulator 24 and the second insulator 25. The insulating layer 27 includes a plurality of protruding portions having a substantially hemispherical shape. The protruding surface of the insulating layer 27 corresponds to the concave lens surface 251 and contacts the concave lens surface 251. The insulating layer 27 has a refractive index lower than a refractive index of the second insulator 25, and has a refractive index equal to a refractive index of the first insulator 24 in the exemplary embodiment. Examples of a structural material for the insulating layer 27 include insulating materials having transmissivity, such as silicon oxide, silicon nitride, and aluminum oxide.

Pixel Electrode

As illustrated in FIG. 4, the plurality of pixel electrodes 28 are disposed on the insulating layer 27. The pixel electrodes 28 are arranged in matrix in the plan view. As illustrated in FIGS. 4 and 5, the pixel electrodes 28 are disposed so as to overlap and contain the second insulators 25 in the plan view. Note that, the alignment film 29 is disposed on the plurality of pixel electrodes 28.

1(d). Optical Path in Element Substrate

Figure 6:
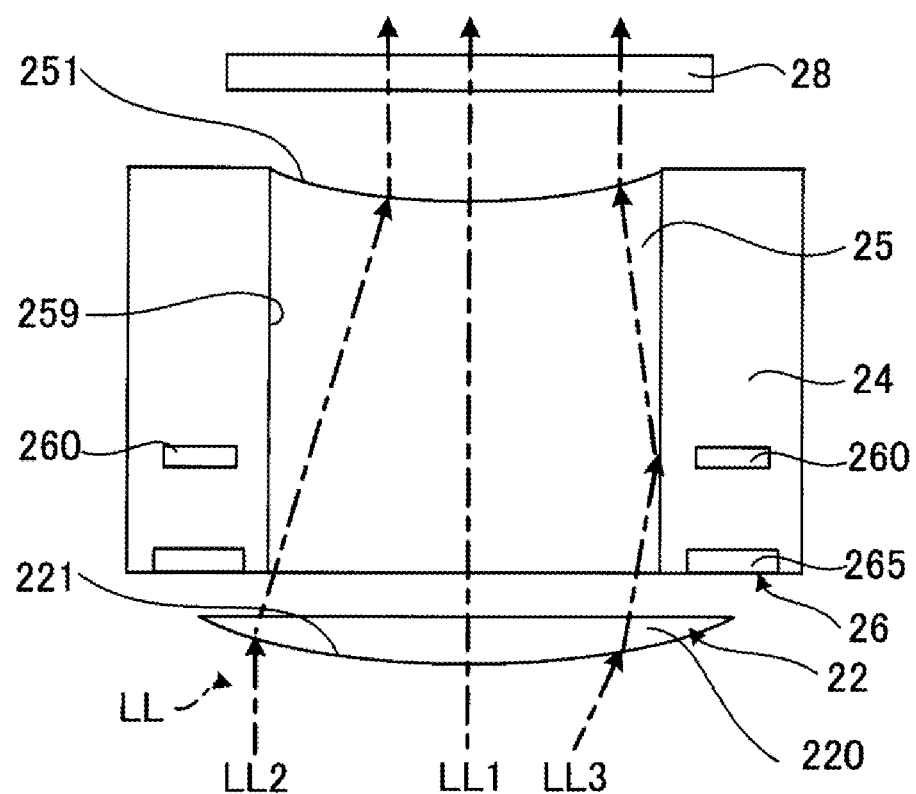
FIG. 6 illustrates a schematic diagram illustrating light passing through the element substrate illustrated in FIG. 4.

Next, an optical path of the element substrate 2 will be described. FIG. 6 is a schematic diagram illustrating light passing through the element substrate illustrated in FIG. 4.

As illustrated in FIG. 6, when the light LL is incident on the element substrate 2, a light beam LL1 of the light LL that passes through the center of the convex lens surface 221 and is parallel to the optical axis of the light LL keeps traveling straight and is then emitted from the central portion of the concave lens surface 251.

On the other hand, for example, a light beam LL2 that passes through a portion close to an outer edge of the convex lens surface 221 and is parallel to the optical axis of the light LL is refracted by the convex lens surface 221 and refracted again by the concave lens surface 251. The light beam LL2 is refracted by the convex lens surface 221 to travel diagonally across the second insulator 25, but the light beam LL2 is refracted again by the concave lens surface 251 to be emitted in parallel with the optical axis from the concave lens surface 251.

For example, a light beam LL3 that passes through a portion close to the outer edge of the convex lens surface 221 and travels diagonally to the optical axis of the light LL is refracted by the convex lens surface 221, reflected by the interface 259, and then refracted again by the concave lens surface 251. The light beam LL3 is totally reflected by the interface 259 due to the relationship in the refractive index between the second insulator 25 and the first insulator 24. For example, a case is considered where the first insulator 24 is made of silicon oxide, the second insulator 25 is made of silicon oxynitride, and the first insulator 24 has a refractive index of 1.46 and the second insulator 25 has a refractive index of 1.64 for visible light having a wavelength of 550 nm. In this case, an incident angle with respect to the interface 259 is greater than or equal to 62°, which results in total reflection by the interface 259 due to the Snell's law. Therefore, the light beam LL3 refracted by the convex lens surface 221 travels diagonally toward the first insulator 24 across the second insulator 25, but the light beam LL3 is totally reflected by the interface 259 to travel toward the inside of the second insulator 25. Accordingly, the light beam LL3 being incident on the first insulator 24 is avoided. In other words, the light beam LL3 being deviated from the second insulator 25 can be avoided. The light beam LL3 totally reflected by the interface 259 is refracted again by the concave lens surface 251 to be emitted in parallel with the optical axis from the concave lens surface 251.

As described above, the light LL is emitted in parallel or substantially parallel with the optical axis from the second insulator 25 to follow each of the optical paths as described above. Thus, the light LL in parallel or substantially parallel with the optical axis can be incident on the pixel electrodes 28 and the liquid crystal layer 5 illustrated in FIG. 2.

Herein, as described above, the liquid crystal display device 100 is a transmissive-type liquid crystal display device that includes the element substrate 2 (first substrate), the counter substrate 3 (second substrate) disposed away from the element substrate 2, and the liquid crystal layer 5 that is disposed between the element substrate 2 and the counter substrate 3 and includes liquid crystal molecules, the liquid crystal display device 100 allowing the light LL incident on the element substrate 2 to be emitted from the counter substrate 3 (see FIG. 2). As illustrated in FIG. 4, the element substrate 2 includes the base material 21 having transmissivity, the light-shielding body 26 disposed away from the base material 21 and disposed in the light-shielding region A11 in a grid pattern, and the pixel electrode 28 disposed in the opening region A12 surrounded by the light-shielding region A11 in the plan view seen from the thickness direction of the element substrate 2. The element substrate 2 further includes the first insulator 24 that overlaps the light-shielding body 26 in the plan view, is disposed between the base material 21 and the pixel electrode 28, and has transmissivity, and the second insulator 25 that overlaps the pixel electrode 28 in the plan view, is disposed in contact with the first insulator 24 between the base material 21 and the pixel electrode 28, and has transmissivity. The element substrate 2 further includes the lens member 220 that overlaps the pixel electrode 28 in the plan view, is disposed between the base material 21 and the second insulator 25, has a surface on the base material 21 side including the convex lens surface 221, and has transmissivity. The second insulator 25 has a refractive index greater than a refractive index of the first insulator 24. A surface of the second insulator 25 on the pixel electrode 28 side includes the concave lens surface 251.

The liquid crystal display device 100 includes the lens member 220 including the convex lens surface 221. Accordingly, the light LL refracted by the convex lens surface 221 is refracted again by the concave lens surface 251 of the second insulator 25, and can thus be parallel or substantially parallel. For this reason, condensation of light can be reduced in the liquid crystal layer 5, such that an increase in intensity of the light LL applied to the liquid crystal molecules can be reduced. A diagonal component of the light LL is reduced when the light LL passes through the liquid crystal layer 5, and thus a decrease in contrast can be reduced. The second insulator 25 has a refractive index greater than a refractive index of the first insulator 24, and can thus function as a waveguide. For this reason, the convex lens surface 221 of the lens member 220 can take more light LL collected in the second insulator 25 into the second insulator 25, such that the light LL that has been taken in can be efficiently guided to the pixel electrode 28. Therefore, utilization efficiency of light, that is, a rate of the light LL incident on the liquid crystal display device 100 to the light LL emitted from the liquid crystal display device 100 can be increased while reducing a decrease in reliability of light resistance due to deterioration of the liquid crystal molecules in comparison with a known transmissive-type liquid crystal display device.

Particularly, in the exemplary embodiment, the surface of the second insulator 25 on the insulating layer 27 side includes the concave lens surface 251 in almost the entire region. For this reason, more light LL in parallel can be incident on the liquid crystal layer 5, and thus the utilization efficiency of the light LL can be increased.

A waveguide can be formed in a simple configuration in which the second insulator 25 is provided in the opening 249 of the first insulator 24. Thus, the element substrate 2 can be easily manufactured.

The first insulator 24 has insulating properties, and thus the scan line 261, the data line 262, and the capacitive line 263 can be disposed in the first insulator 24. Herein, in a case where the first insulator 24 and the second insulator 25 are formed by using a material that does not have insulating properties, such as AlGaAs, a material for insulating the scan line 261, the data line 262, and the capacitive line 263 from one another needs to be used separately. On the other hand, the first insulator 24 and the second insulator 25 having insulating properties eliminate the need. Thus, the configuration of the light-guiding layer 20 can be simplified.

As described above, the insulating layer 27 (third insulator) is provided that is disposed in contact with the concave lens surface 251 and the pixel electrode 28 between the second insulator 25 and the pixel electrode 28, has a refractive index lower than a refractive index of the second insulator 25, and has transmissivity.

An influence of, for example, air on interface reflection of the light LL can be further reduced by providing the insulating layer 27 in comparison with a case where there is space between the second insulator 25 and the pixel electrode 28, and thus a transmission loss of the light LL can be reduced. For this reason, more light LL can be guided to the pixel electrode 28, and the utilization efficiency of the light LL can be further increased.

As described above, the lens member 220, particularly, the convex lens surface 221 is larger than the second insulator 25 and overlaps the second insulator 25 in the plan view (see FIGS. 4 and 5).

In this way, more light LL can be taken into the second insulator 25 in comparison with a case where the lens member 220 is smaller than the second insulator 25 in the plan view, for example. For this reason, the utilization efficiency of the light LL can be further increased.

Particularly, in the exemplary embodiment, the convex lens surface 221 of the lens member 220 is disposed so as to contain the second insulator 25 in the plan view. For this reason, the light LL across a wider range can be guided into the second insulator 25 in comparison with a case where the second insulator 25 contains the convex lens surface 221 in the plan view. In the exemplary embodiment, the lens member 220 overlaps the light-shielding body 26 in the plan view. In this way, the light LL that may be incident on the light-shielding body 26 can also be guided into the second insulator 25, and thus the light LL shielded by the light-shielding body 26 can be reduced.

Furthermore, as described above, the concave lens surface 251 of the second insulator 25 has a curvature greater than a curvature of the convex lens surface 221 of the lens member 220.

When the concave lens surface 251 of the second insulator 25 is contained in the convex lens surface 221 of the lens member 220 in the plan view as in the exemplary embodiment, the concave lens surface 251 preferably has a curvature greater than a curvature of the convex lens surface 221. In this way, the concave lens surface 251 can restore the light LL refracted by the convex lens surface 221 to a state where the light LL is substantially more parallel. For this reason, the light LL being substantially more parallel can be incident on the liquid crystal layer 5, such that a decrease in reliability of light resistance due to deterioration of the liquid crystal molecules can be further reduced. Note that, it is particularly efficient to increase a curvature of the concave lens surface 251 to be greater than a curvature of the convex lens surface 221 when the second insulator 25 and the lens member 220 are equal in refractive index.

As described above, the insulating layer 23 (fourth insulator) that overlaps the pixel electrode 28 of the light-shielding body 26 in the plan view, has a refractive index lower than a refractive index of both the second insulator 25 and the lens member 220, and has transmissivity is disposed between the second insulator 25 and the lens member 220.

The convex lens surface 221 can be easily made to be larger than the concave lens surface 251 by providing the insulating layer 23 in comparison with a case where the second insulator 25 directly contacts the lens member 220. For this reason, the light LL shielded by the light-shielding body 26 can be further reduced. Accordingly, more light can be taken into the second insulator 25. In addition, a transmission loss of the light LL can be reduced because the insulating layer 23 is located between the second insulator 25 and the lens member 220 in comparison with a case where there is a gap between the second insulator 25 and the lens member 220. For this reason, more light LL can be guided to the pixel electrode 28. Therefore, the utilization efficiency of the light LL can be further increased with the insulating layer 23.

As described above, the light-shielding body 26 is contained in the first insulator 24 in the plan view. Particularly, the light-shielding body 26 is embedded in the first insulator 24 in the exemplary embodiment. Thus, the light-shielding body 26 does not contact the second insulator 25. In a case where the light-shielding layer 265 of the light-shielding body 26 is provided so as to contact the second insulator 25, the light LL reflected by an edge of the light-shielding layer 265 may be reflected diffusely due to an irregular reflection direction and enter the first insulator 24. On the other hand, the light-shielding body 26 is contained in the first insulator 24 in the plan view, such that the light LL can be prevented from being reflected diffusely by an end surface of the light-shielding layer 265 and the light LL being incident on the TFT 260 can thus be more effectively avoided.

As illustrated in FIG. 4, the second insulators 25 are provided across almost the entire region in the range in which the first insulator 24 is provided in the thickness direction (z-axis direction) of the element substrate 2. Specifically, the position of the surface 2501 of the second insulator 25 on the base material 21 side is identical to the position of the surface 2651 of the light-shielding layer 265 on the base material 21 side when seen from the y-axis direction. Further, the position of the center 2511 of the concave lens surface 251 of the second insulator 25 is located on the insulating layer 27 side with respect to the surface 2621 of the data line 262 on the insulating layer 27 side when seen from the y-axis direction. The second insulator 25 is provided in such a manner, and thus the second insulator 25 can more effectively function as a waveguide in comparison with a case where the second insulator 25 is not provided across almost the entire region in the range of the first insulator 24 in the z-axis direction. The light LL can also be prevented from being incident on the TFT 260.

1(e). Method for Manufacturing Element Substrate

Figure 7:
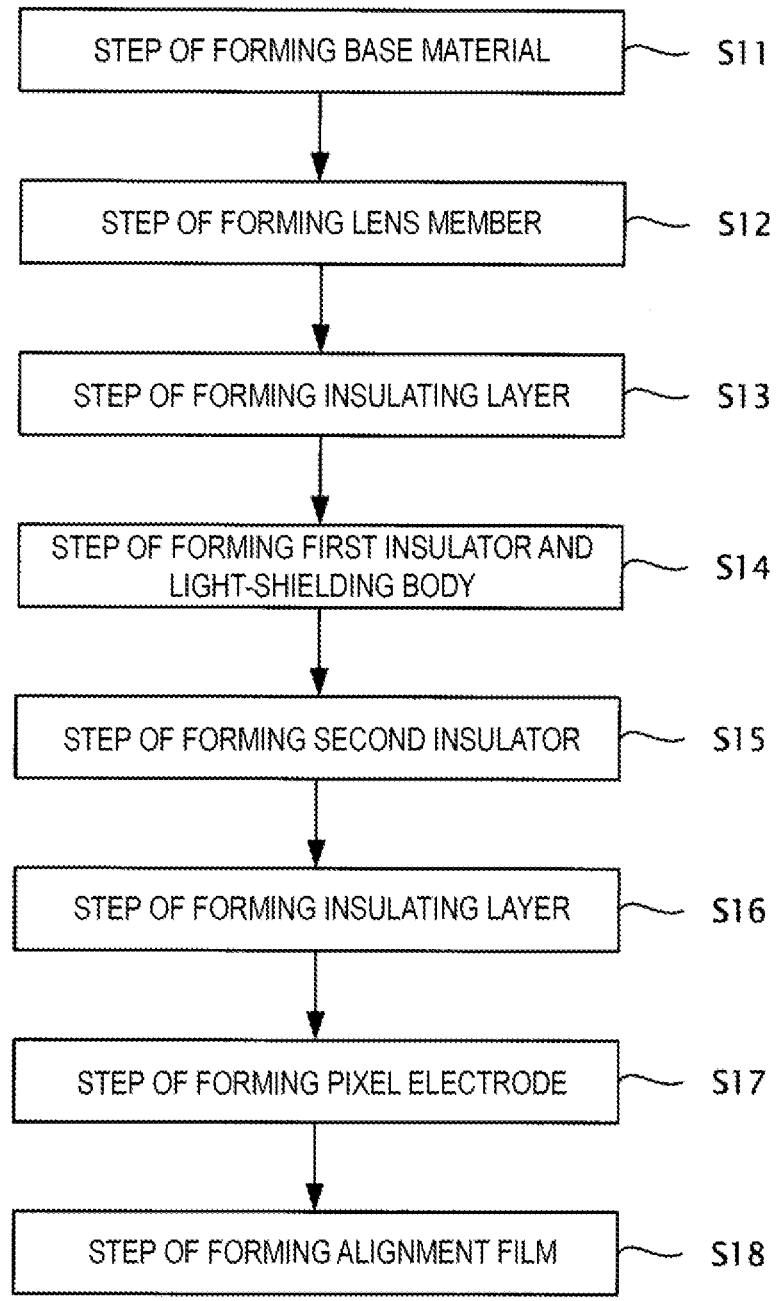
FIG. 7 illustrates a flowchart of a method for manufacturing the element substrate illustrated in FIG. 4.

Next, a method for manufacturing the element substrate 2 will be described. FIG. 7 is a flowchart of the method for manufacturing the element substrate illustrated in FIG. 4.

As illustrated in FIG. 7, the method for manufacturing the element substrate 2 includes a step of forming a base material (Step S11), a step of forming a lens member (Step S12), a step of forming an insulating layer (Step S13), a step of forming a first insulator and a light-shielding body (Step S14), a step of forming a second insulator (Step S15), a step of forming an insulating layer (Step S16), a step of forming a pixel electrode (Step S17), and a step of forming an alignment film (Step S18). The element substrate 2 is manufactured by performing the steps in order. Hereinafter, each of the steps will be successively described.

Step of Forming Base Material (Step S11)

Figure 8:
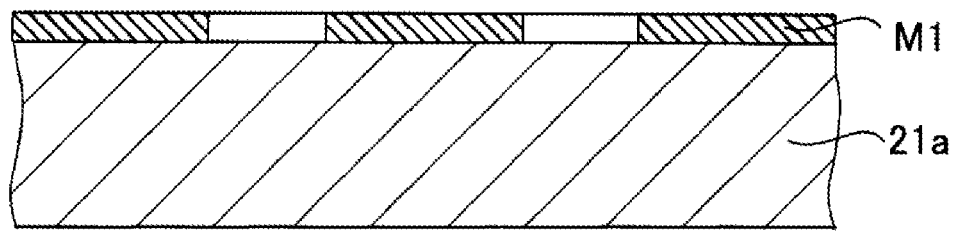
FIG. 8 is a cross-sectional view illustrating a step of forming a base material in Step S11.
Figure 9:
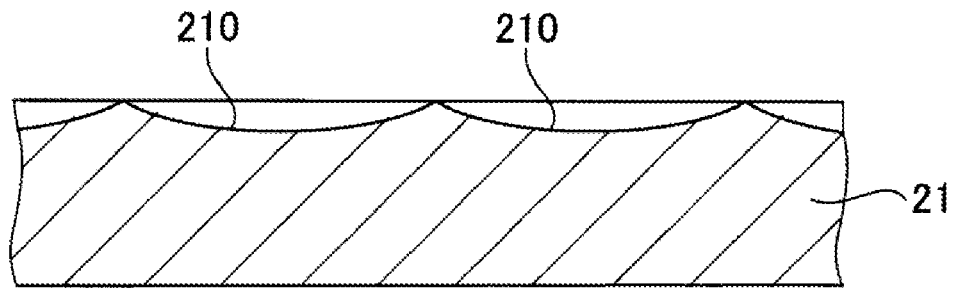
FIG. 9 is a cross-sectional view illustrating the step of forming a base material in Step S11.

Each of FIGS. 8 and 9 is a cross-sectional view illustrating the step of forming a base material in Step S11. First, as illustrated in FIG. 8, a basic material 21a of the base material 21 formed of, for example, a glass plate or a quartz plate is prepared, and a mask M1 having a plurality of openings is formed on the basic material 21a. Next, as illustrated in FIG. 9, isotropic etching is performed by using the mask M1. For example, a part of the basic material 21a is removed by wet etching with an etching solution containing fluorine, for example. In this way, the base material 21 having the plurality of recessed portions 210 is formed. The hemispherical recessed portions 210 can be easily formed by performing isotropic etching.

Step of Forming Lens Member (Step S12)

Figure 10:
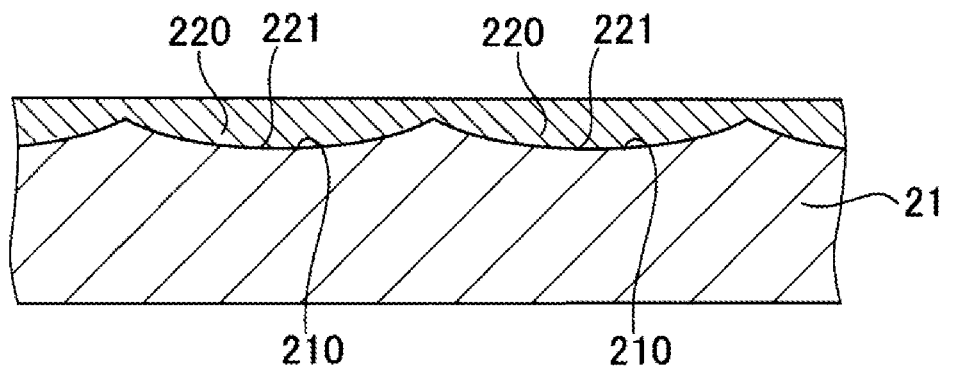
FIG. 10 is a cross-sectional view illustrating a step of forming a lens member in Step S12.

FIG. 10 is a cross-sectional view illustrating the step of forming a lens member in Step S12. Next, as illustrated in FIG. 10, the microlens array 22 is formed. Specifically, for example, after silicon oxynitride is deposited in the recessed portions 210 of the base material 21 by vapor deposition such as plasma chemical vapor deposition (CVD), an upper surface is polished by chemical-mechanical polishing (CMP).

Step of Forming Insulating Layer (Step S13)

Next, the insulating layer 23 is formed on the microlens array 22, which is not illustrated. The insulating layer 23 is formed by forming a film of a material containing, for example, silicon oxide on the microlens array 22 by vapor deposition such as CVD.

Step of Forming First Insulator and Light-Shielding Body (Step S14)

Figure 11:
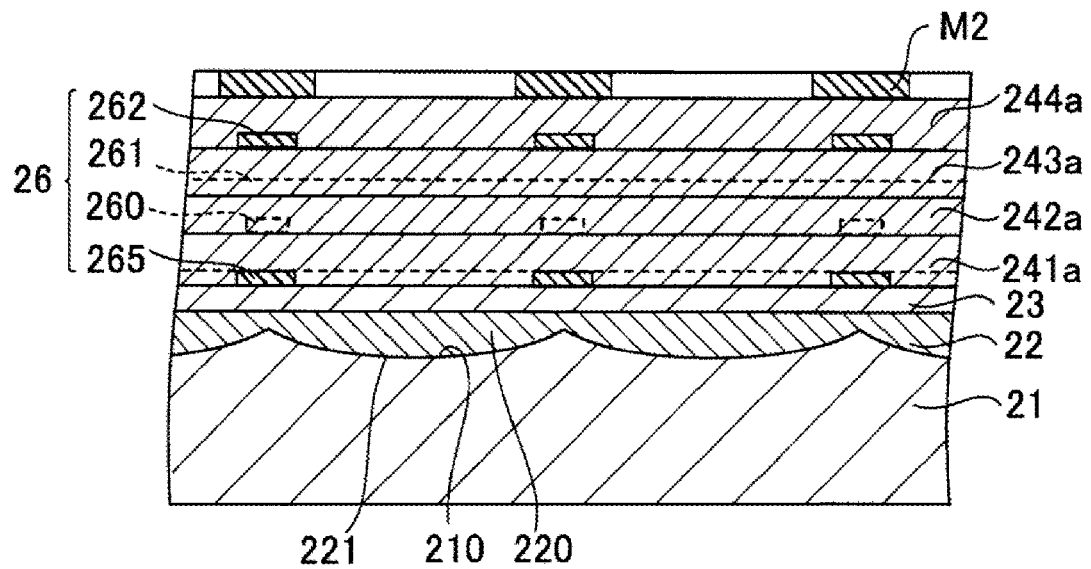
FIG. 11 is a cross-sectional view illustrating a step of forming a first insulator and a light-shielding body in Step S14.
Figure 12:
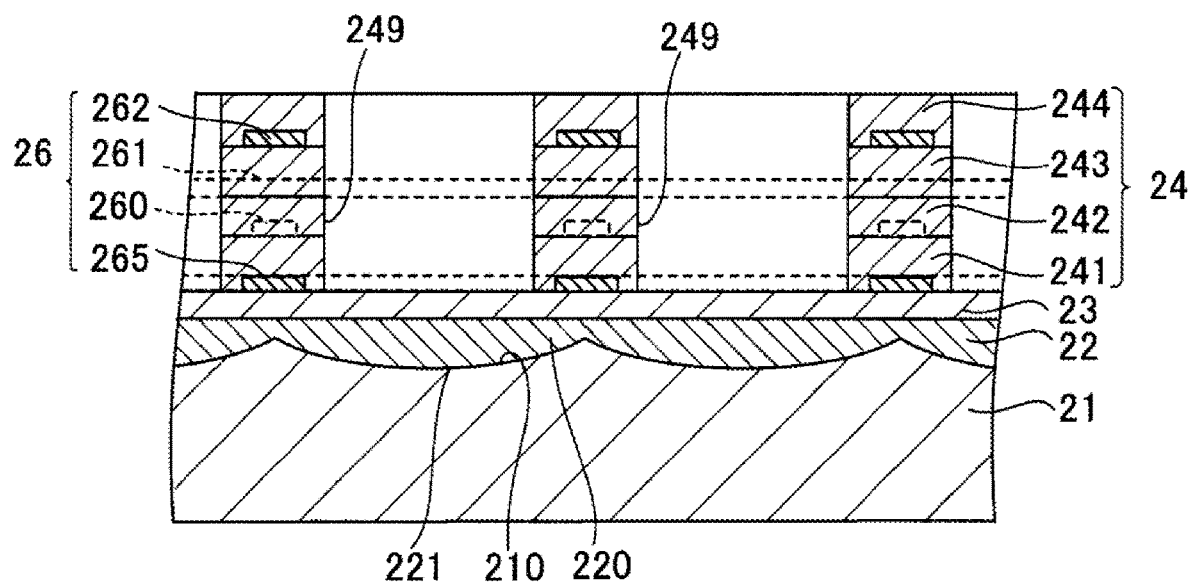
FIG. 12 is a cross-sectional view illustrating the step of forming a first insulator and a light-shielding body in Step S14.

Each of FIGS. 11 and 12 is a cross-sectional view illustrating the step of forming a first insulator and a light-shielding body in Step S14. Next, the first insulator 24 and the light-shielding body 26 are formed. Note that, the capacitive line 263 is also formed, but the description and illustration are omitted from the description of the step.

Specifically, as illustrated in FIG. 11, the light-shielding layer 265, an insulating layer 241*a*, the TFT 260, an insulating layer 242*a*, the scan line 261, an insulating layer 243*a*, the data line 262, and an insulating layer 244*a* are laminated on the insulating layer 23 in this order. Subsequently, a mask M2 having a plurality of openings is formed on the insulating layer 244*a*. The insulating layer 241*a* is a layer to be the insulating layer 241 subsequently. The insulating layer 242*a* is a layer to be the insulating layer 242 subsequently. The insulating layer 243*a* is a layer to be the insulating layer 243 subsequently. The insulating layer 244*a* is a layer to be the insulating layer 244 subsequently. Each of the insulating layers 241*a*, 242*a*, 243*a*, and 244*a* is formed by forming a film of a layer made of, for example, silicon oxide by CVD. Each of the TFT 260, the light-shielding layer 265, the scan line 261, and the data line 262 is formed by forming a film of a layer made of, for example, metal such as aluminum by sputtering or CVD and then performing patterning, which is not illustrated in detail.

Next, anisotropic etching is performed by using the mask M2 having the plurality of openings. As illustrated in FIG. 12, a part of the insulating layers 241*a*, 242*a*, 243*a*, and 244*a* is removed by dry etching with etching gas in which halogen-based gas, such as fluorine, is mixed with oxygen or carbon monoxide. In this way, as illustrated in FIG. 12, the first insulator 24 and the light-shielding body 26 are formed. As described above, the manufacturing process can be simplified by forming the insulating layers 241*a*, 242*a*, 243*a*, and 244*a* and then collectively removing a part of the insulating layers 241*a*, 242*a*, 243*a*, and 244*a*. Smoothness of the inner wall surface forming the opening 249 of the first insulator 24 can also be increased.

Step of Forming Second Insulator (Step S15)

Figure 13:
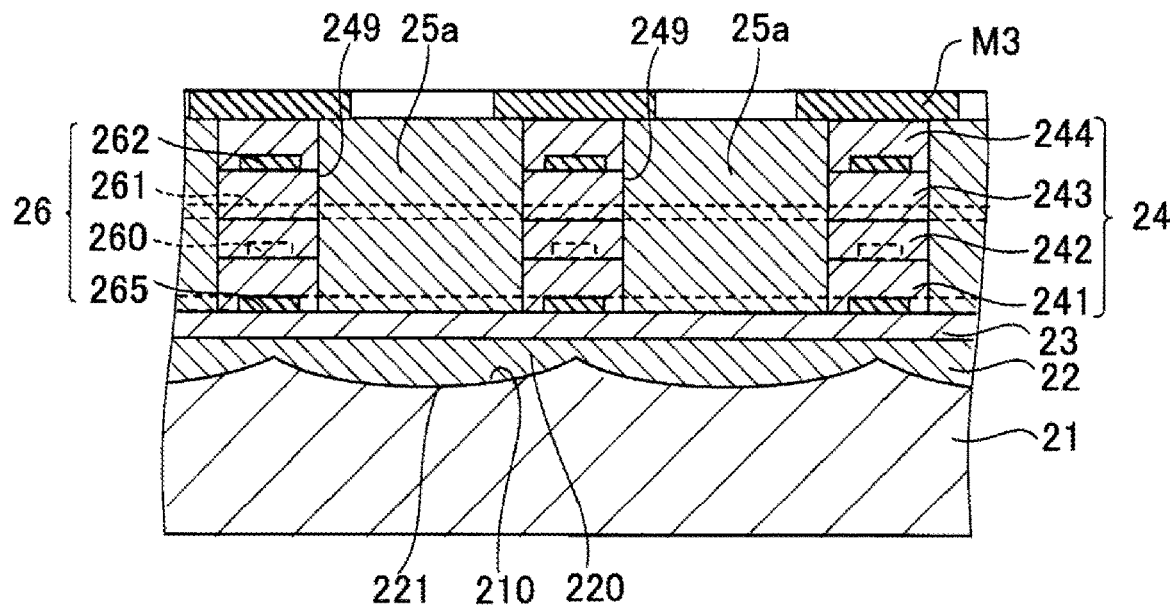
FIG. 13 is a cross-sectional view illustrating a step of forming a second insulator in Step S15.
Figure 14:
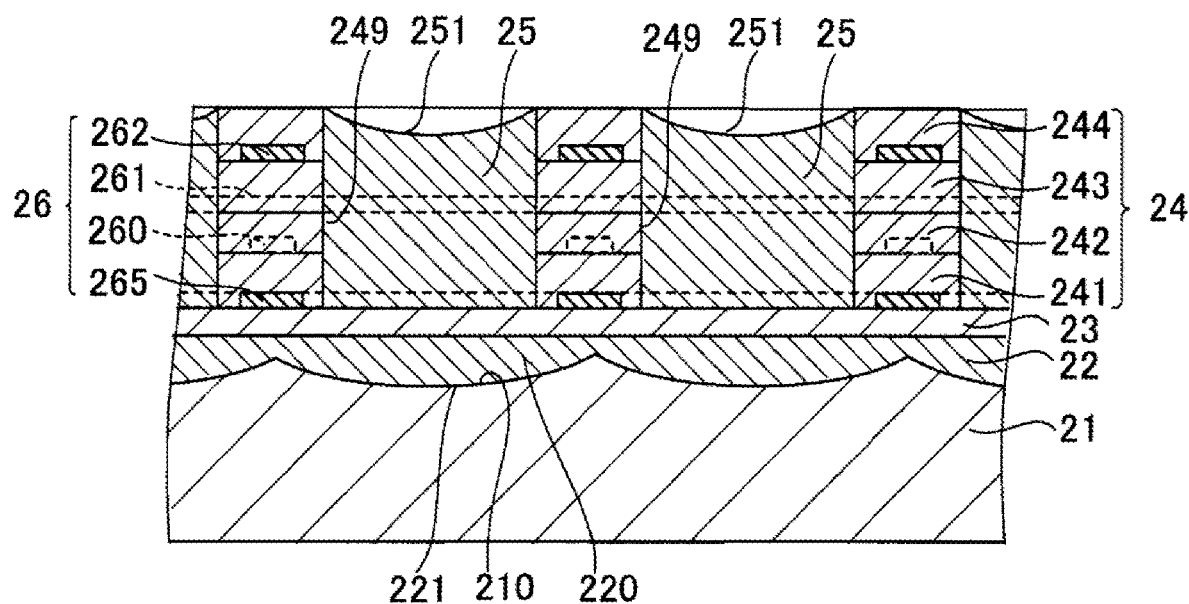
FIG. 14 is a cross-sectional view illustrating the step of forming a second insulator in Step S15.

Each of FIGS. 13 and 14 is a cross-sectional view illustrating the step of forming a second insulator in Step S15. Next, the plurality of second insulators 25 are formed.

Specifically, as illustrated in FIG. 13, insulators 25*a* are formed by depositing, for example, silicon oxynitride in the openings 249 by vapor deposition such as CVD, and a mask M3 having a plurality of openings is formed on the first insulator 24. The insulators 25*a* are a layer to be the second insulators 25 subsequently.

Next, isotropic etching is performed by using the mask M3 having the plurality of openings. As illustrated in FIG. 14, a part of the insulator 25*a* is removed by dry etching with etching gas in which halogen-based gas, such as fluorine, is mixed with oxygen or carbon monoxide. In this way, as illustrated in FIG. 14, the second insulators 25 including the plurality of concave lens surfaces 251 are formed. The second insulators 25 including the concave lens surfaces 251 can be easily formed with high precision by performing isotropic etching by dry etching.

Step of Forming Insulating Layer (Step S16)

Figure 15:
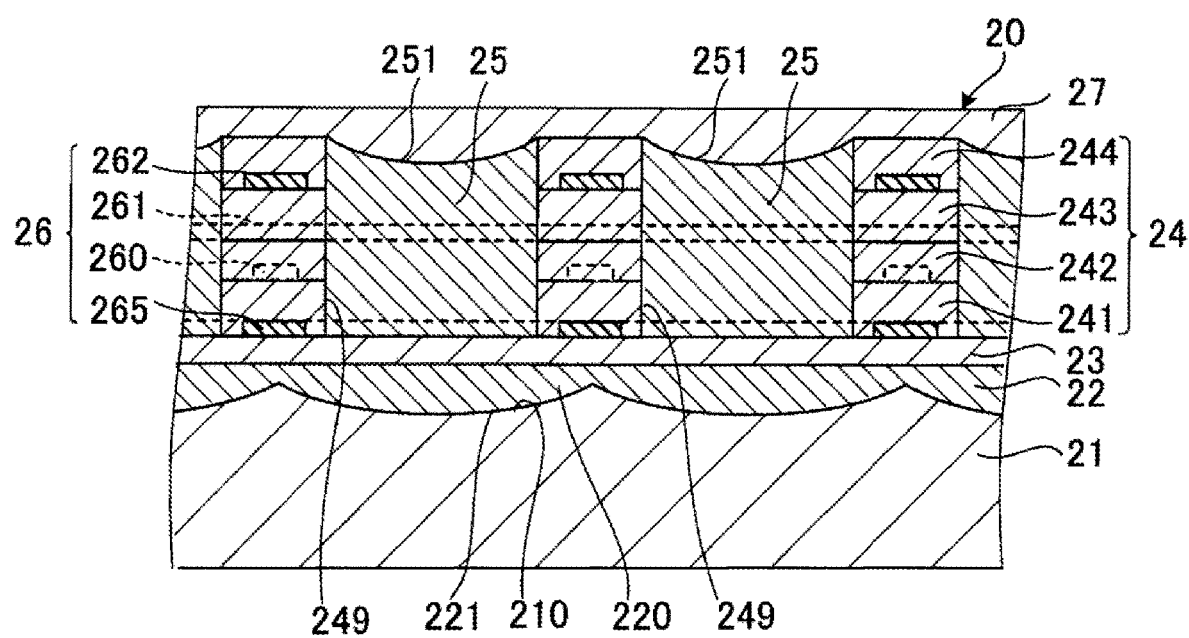
FIG. 15 is a cross-sectional view illustrating a step of forming an insulating layer in Step S16.

FIG. 15 is a cross-sectional view illustrating a step of forming an insulating layer in Step S16. Next, as illustrated in FIG. 15, the insulating layer 27 is formed. The insulating layer 27 is formed by depositing a material containing, for example, silicon oxide on the first insulator 24 and the second insulators 25 by vapor deposition such as CVD and then polishing an upper surface by chemical-mechanical polishing (CMP).

Step of Forming Pixel Electrode (Step S17)

Next, the plurality of pixel electrodes 28 are formed on the insulating layer 27, which is not illustrated. The pixel electrodes 28 are formed by forming a layer formed of, for example, a transparent electrode material by vapor deposition such as CVD and then performing patterning with a mask.

Step of Forming Alignment Film (Step S18)

Next, the alignment film 29 is formed, which is not illustrated. The alignment film 29 is formed by forming a layer made of, for example, polyimide by vapor deposition such as CVD and then performing rubbing processing.

As described above, the element substrate 2 illustrated in FIG. 4 can be formed. Note that, the counter substrate 3 is formed by appropriately using a known technology, and the element substrate 2 and the counter substrate 3 are coupled to each other via the sealing member 4. Subsequently, a liquid crystal material is injected between the element substrate 2, the counter substrate 3, and the sealing member 4 to form the liquid crystal layer 5, and the liquid crystal layer 5 is then sealed. Various circuits and wiring are also formed appropriately. The liquid crystal display device 100 illustrated in FIGS. 1 and 2 can be manufactured in such a manner.

The liquid crystal display device 100 in the exemplary embodiment has been described above. Note that, each of the concave lens surface 251 and the convex lens surface 221 is a spherical surface in the exemplary embodiment, but may be an aspherical surface.

The pixel electrode 28 contains the second insulator 25 in the plan view in the exemplary embodiment, but may not contain the second insulator 25 in the plan view, for example, as long as the pixel electrode 28 overlaps the opening region A12 in the plan view.

The lens member 220 is disposed so as to contain the second insulator 25 in the plan view in the drawing, but may be smaller than the second insulator 25 in the plan view and may not contain the second insulator 25 as long as the lens member 220 overlaps the second insulator 25 in the plan view.

The case where the concave lens surface 251 has a curvature greater than a curvature of the convex lens surface 221 is described as an example in the exemplary embodiment, but the concave lens surface 251 may have a curvature smaller than or equal to a curvature of the convex lens surface 221.

The light-shielding body 26 may further include a light-shielding layer having light-shielding properties in addition to the TFT 260, the scan line 261, the data line 262, the capacitive line 263, and the light-shielding layer 265. The order in which the TFT 260, the scan line 261, the data line 262, and the light-shielding layer 265 are laminated is not limited to the order of lamination illustrated in FIG. 4. The number of laminated layers of each of the light-shielding body 26 and the first insulator 24 is not limited to the illustrated number and may be any number.

The second insulator 25 is provided so as to fill the opening 249 of the first insulator 24 in the exemplary embodiment, but may not be provided so as to fill the opening 249 as long as the second insulator 25 contacts at least the first insulator 24.

The position of the second insulator 25 in the thickness direction of the element substrate 2 is not limited to the illustrated position. However, the second insulator 25 is preferably provided in such a way that at least the light LL does not pass through the TFT 260.

The light-shielding body 26 is embedded in the first insulator 24 in the exemplary embodiment, but a part of the light-shielding body 26 may be exposed from the first insulator 24.

The "third insulator" includes one insulating layer 27, but may include a plurality of insulating layers. However, the "third insulator" preferably includes one insulating layer 27 instead of a laminated body of a plurality of insulating layers because a decrease in transmission loss of the light LL does not occur in each interface. The insulating layer 27 may be appropriately omitted. Note that, similarly, the "fourth insulator" includes one insulating layer 23, but may include a plurality of insulating layers.

Modification Example

Figure 16:
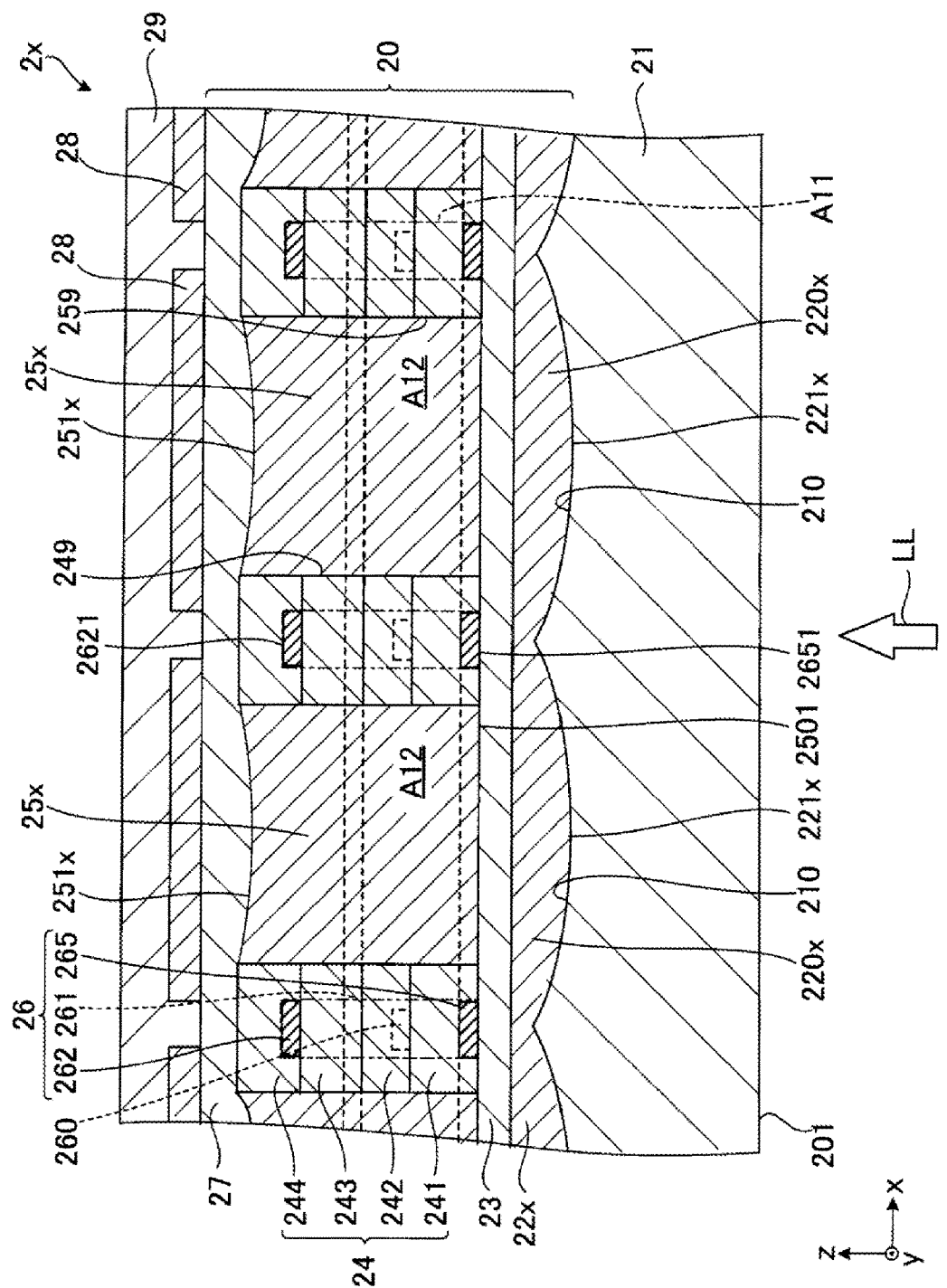
FIG. 16 is an enlarged cross-sectional view illustrating a modification example of the element substrate in the first exemplary embodiment.

FIG. 16 is an enlarged cross-sectional view illustrating a modification example of the element substrate in the first exemplary embodiment.

In a second insulator 25x provided in an element substrate 2x illustrated in FIG. 16, a concave lens surface 251x has a curvature substantially equal to a curvature of a convex lens surface 221x of a lens member 220x provided in a microlens array 22x. The second insulator 25x has a refractive index greater than a refractive index of the lens member 220x. Note that, the lens member 220x is larger than the second insulator 25x in the plan view.

According to the second insulator 25x and the lens member 220x in such a configuration, the light LL passing through the concave lens surface 251x can be substantially more parallel to the optical axis of the light LL incident on the element substrate 2x in comparison with the case where the second insulator 25x has a refractive index equal to a refractive index of the lens member 220x.

Second Exemplary Embodiment

Next, a second exemplary embodiment of the invention will be described.

Figure 17:
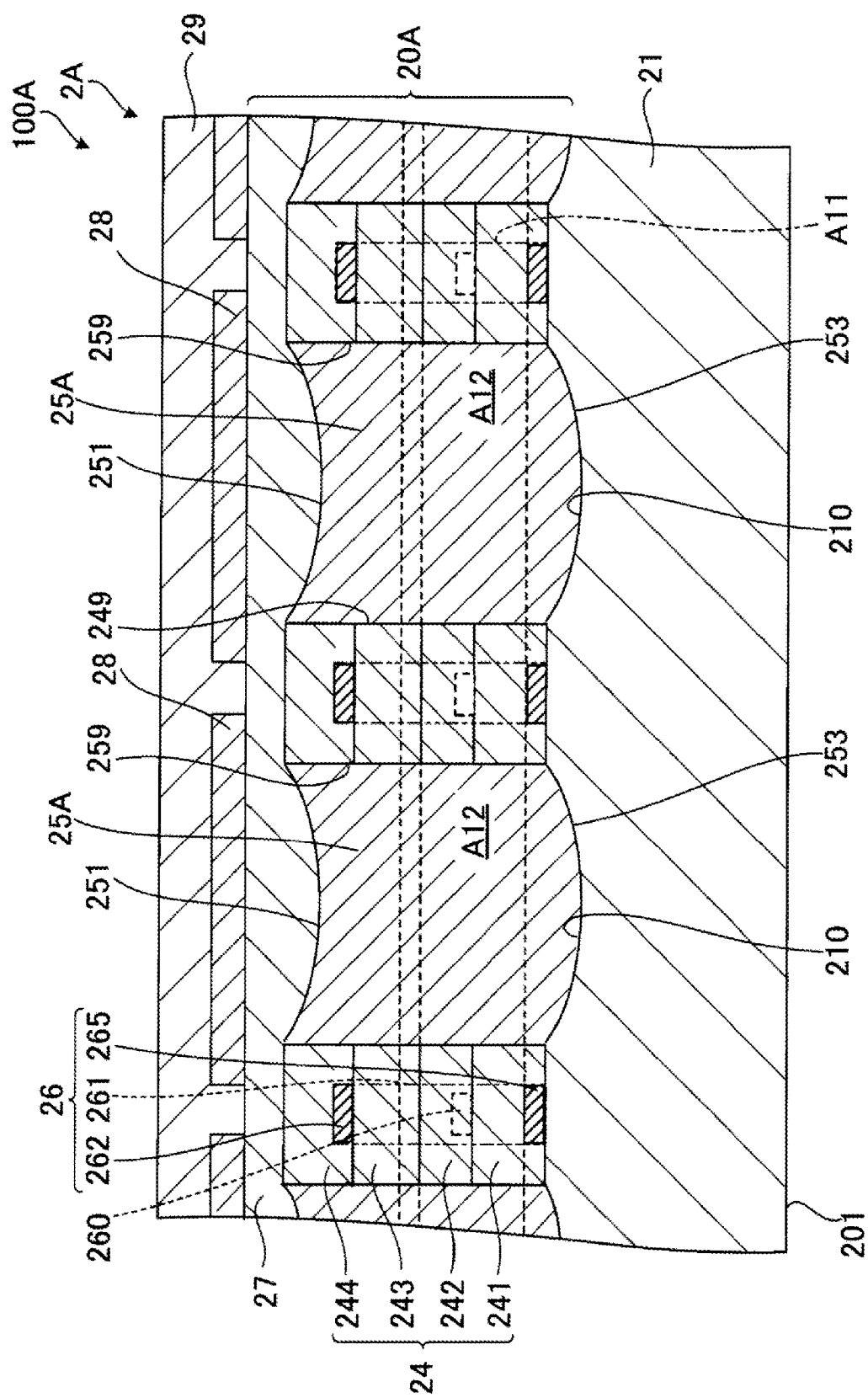
FIG. 17 is an enlarged cross-sectional view of an element substrate provided in a liquid crystal display device in a second exemplary embodiment.

FIG. 17 is an enlarged cross-sectional view of an element substrate provided in a liquid crystal display device in the second exemplary embodiment.

The exemplary embodiment is identical to the first exemplary embodiment described above except mainly for that the microlens array in the first exemplary embodiment is not provided and the second insulator includes the convex lens surface.

Note that, differences between the second exemplary embodiment and the above-described exemplary embodiment will be mainly described in the following description, and the same matters will not be described. The same configurations as those in the first exemplary embodiment described above are provided with the same reference signs in FIG. 17.

A light-guiding layer 20A provided in an element substrate 2A of a liquid crystal display device 100A illustrated in FIG. 17 does not include the microlens array 22 in the first exemplary embodiment, and a surface of a second insulator 25A on the base material 21 side includes a convex lens surface 253. Therefore, in the exemplary embodiment, the second insulator 25A has such a configuration that the second insulator 25 and the lens member 220 in the first exemplary embodiment are integrally formed.

The convex lens surface 253 corresponds to the surface of the base material 21 in which the recessed portion 210 is formed and contacts the surface. The convex surface 253 is located on the base material 21 side with respect to the surface of the first insulator 24 on the base material 21 side. The convex lens surface 253 has the size identical to the concave lens surface 251 and overlaps the concave lens surface 251 in the plan view. The convex lens surface 253 has a curvature equal to a curvature of the concave lens surface 251.

As described above, the second insulator 25A is provided in such a way that the second insulator 25 and the lens member 220 in the first exemplary embodiment are integrally formed. Thus, the liquid crystal display device 100A having high utilization efficiency of the light LL while reducing a decrease in reliability of light resistance can be achieved with a simpler configuration than that of the first exemplary embodiment. Further, the manufacturing process of the element substrate 2A can be more facilitated than that of the first exemplary embodiment.

2. Projection-Type Display Apparatus

Figure 18:
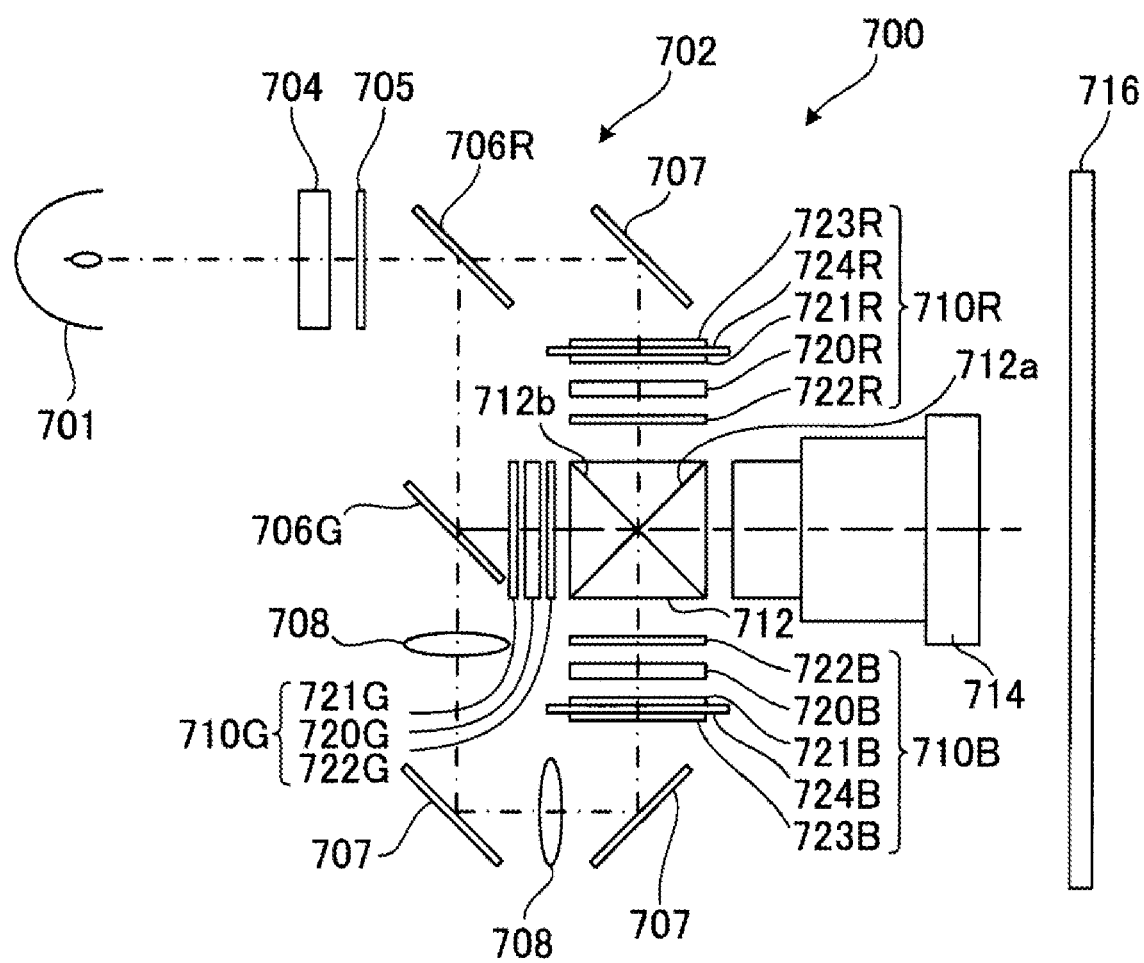
FIG. 18 is a schematic diagram illustrating one example of a projection-type display apparatus.

Next, a projection-type display apparatus as one example of an electronic apparatus in the invention will be described. FIG. 18 is a schematic diagram illustrating one example of a projection-type display apparatus including a liquid crystal display device.

As illustrated in FIG. 18, a projector 700 as a projection-type display apparatus includes a light source device 701, an integrator 704, a polarized light converting element 705, a color separation light-guiding optical system 702, a liquid crystal light modulation device 710R, a liquid crystal light modulation device 710G, and a liquid crystal light modulation device 710B as light modulation devices, a cross dichroic prism 712, and a projection optical system 714. As described later in detail, the liquid crystal light modulation devices 710R, 710G, and 710B respectively include liquid crystal display devices 720R, 720G, and 720B. For example, the liquid crystal display devices 100 and 100A described above can be used as the liquid crystal display devices 720R, 720G, and 720B.

The light source device 701 supplies light LL including red light (hereinafter referred to as "R light") as first color light, green light (hereinafter referred to as "G light") as second color light, and blue light (hereinafter referred to as "B light") as third color light. For example, an extra-high pressure mercury lamp can be used as the light source device 701.

The integrator 704 equalizes an illumination distribution of the light LL emitted from the light source device 701. The polarized light converting element 705 converts the light LL having the equalized illumination distribution into polarized light having a specific vibration direction, such as s-polarized light that has been s-polarized with respect to a reflection surface provided in the color separation light-guiding optical system 702, for example. The s-polarized light converted from the light is incident on an R-light transmission dichroic mirror 706R constituting the color separation light-guiding optical system 702.

The color separation light-guiding optical system 702 includes the R-light transmission dichroic mirror 706R, a B-light transmission dichroic mirror 706G, three reflection mirrors 707, and two relay lenses 708.

The R-light transmission dichroic mirror 706R separates R light from other light to allow passage of the R light and reflect G light and B light. The R light passing through the R-light transmission dichroic mirror 706R is incident on the reflection mirror 707. The reflection mirror 707 bends an optical path of the R light at 90 degrees. The R light having the bent optical path is incident on the liquid crystal modulation device 710R.

The liquid crystal light modulation device 710R is a transmissive-type liquid crystal device configured to modulate the R light according to an image signal. The liquid crystal light modulation device 710R includes a A/2 phase difference plate 723R, a glass plate 724R, a first polarizing plate 721R, the liquid crystal display device 720R, and a second polarizing plate 722R. The A/2 phase difference plate 723R and the first polarizing plate 721R are disposed in contact with the transmissive glass plate 724R that does not convert a polarization direction.

An optical path of each of the G light and the B light is bent at 90 degrees by reflecting the G light and the B light with the R light transmission dichroic mirror 706R. The G light and the B light having the bent optical paths are each incident on the B-light transmission dichroic mirror 706G. The B-light transmission dichroic mirror 706G separates the B light from other light to allow passage of the B light and reflect the G light. The G light reflected by the B-light transmission dichroic mirror 706G is incident on the liquid crystal light modulation device 710G. The liquid crystal light modulation device 710G is a transmissive-type liquid crystal device configured to modulate the G light according to an image signal. The liquid crystal light modulation device 710G includes the liquid crystal display device 720G, a first polarizing plate 721G, and a second polarizing plate 722G.

The G light incident on the liquid crystal light modulation device 710G is converted into s-polarized light. The s-polarized light incident on the liquid crystal light modulation device 710G passes through the first polarizing plate 721G without change and is incident on the liquid crystal display device 720G. The G light of the s-polarized light incident on the liquid crystal display device 720G is converted into p-polarized light by modulation according to an image signal. The p-polarized light converted from the G light by modulation in the liquid crystal display device 720G is emitted from the second polarizing plate 722G. In this way, the G light modulated in the liquid crystal light modulation device 710G is incident on the cross dichroic prism 712.

The B light passing through the B-light transmission dichroic mirror 706G is incident on the liquid crystal light modulation device 710B through the two relay lenses 708 and the two reflection mirrors 707.

The liquid crystal light modulation device 710B is a transmissive-type liquid crystal device configured to modulate the B light according to an image signal. The liquid crystal light modulation device 710B includes a λ/2 phase difference plate 723B, a glass plate 724B, a first polarizing plate 721B, the liquid crystal display device 720B, and a second polarizing plate 722B. The B light incident on the liquid crystal light modulation device 710B is converted into s-polarized light. The s-polarized light incident on the liquid crystal light modulation device 710B is converted into p-polarized light by the λ/2 phase difference plate 723B. The p-polarized light converted from the B light passes through the glass plate 724B and the first polarizing plate 721B without change, and is incident on the liquid crystal display device 720B. The B light of the p-polarized light incident on the liquid crystal display device 720B is converted into s-polarized light by modulation according to an image signal. The s-polarized light converted from the B light by modulation in the liquid crystal display device 720B is emitted from the second polarizing plate 722B. The B light modulated in the liquid crystal light modulation device 710B is incident on the cross dichroic prism 712.

The cross dichroic prism 712 as a color synthesis optical system includes two dichroic films 712a and 712b disposed orthogonal to each other in an X shape. The dichroic film 712a reflects the B light and allows passage of the G light. The dichroic film 712b reflects the R light and allows passage of the G light. The cross dichroic prism 712 synthesizes the R light, the G light, and the B light modulated in the liquid crystal light modulation devices 710R, 710G, and 710B, respectively.

The projection optical system 714 projects the light synthesized in the cross dichroic prism 712 onto a screen 716. In this way, a full color image can be obtained on the screen 716.

The projector 700 includes the liquid crystal display device 100 or 100A described above. As described above, the liquid crystal display devices 100 and 100A have high utilization efficiency of light while reducing a decrease in reliability of light resistance in comparison with a known liquid crystal display device. Thus, the projector 700 having a high degree of reliability can be provided.

Herein, a part of light is more likely to be deviated from the projection optical system 714 with the liquid crystal display device configured to emit light radially, for example. However, the liquid crystal display devices 100 and 100A can each emit parallel light or substantially parallel light, and thus the projector 700 can reduce light deviated from the projection optical system 714. Accordingly, more light can be incident on the projection optical system 714.

Note that, the liquid crystal display devices 100 and 100A described above can be each used as a front projection projector configured to project a projection image from an observing side and a rear projection projector configured to project a projection image from a side opposite to the observing side.

Note that, electronic apparatuses including the liquid crystal display device 100 or 100A are not limited to projectors. For example, the liquid crystal display devices 100 and 100A may be each used as a projection type Head Up Display (HUD), a direct-view type Head Mounted Display (HMD), or a display unit of an information terminal apparatus, such as an electronic book, a personal computer, a digital still camera, a liquid crystal television, a viewfinder type or monitor direct-view type video recorder, a car navigation system, an electronic organizer, and a POS.

The transmissive-type liquid crystal display device and the electronic apparatus in the invention have been described above based on the illustrated exemplary embodiments, but the invention is not limited to these. The configuration of each unit in the invention may be replaced with any configuration that achieves the same functions as those in the above-described exemplary embodiments, and may also be added with any configuration. In addition, any configurations in each of the exemplary embodiments described above may be combined together in the invention.

The entire disclosure of Japanese Patent Application No. 2018-012188, filed Jan. 29, 2018 is expressly incorporated by reference herein.

What is claimed is:

1. A transmissive-type liquid crystal display device comprising:
   a first substrate;
   a second substrate disposed away from the first substrate; and
   a liquid crystal layer that is disposed between the first substrate and the second substrate and includes liquid crystal molecules,
   the transmissive-type liquid crystal display device allowing light incident on the first substrate to be emitted from the second substrate, wherein
   the first substrate includes
   a base material having transmissivity,
   a pixel electrode,
   a light-shielding body,
   a first insulator that overlaps the light-shielding body in a plan view seen from a thickness direction of the first substrate, is disposed between the base material and the pixel electrode, and has transmissivity,
   a second insulator that overlaps the pixel electrode in the plan view, is disposed in contact with the first insulator between the base material and the pixel electrode, a surface of the second insulator on the pixel electrode side includes a concave lens surface, the second insulator having transmissivity,
   a third insulator is provided to be disposed in contact with the concave lens surface and the pixel electrode between the second insulator and the pixel electrode, and has transmissivity,
   a lens member that overlaps the pixel electrode in the plan view, is disposed between the base material and the second insulator, has a surface on the base material side including a convex lens surface, and has transmissivity,
   the second insulator has a refractive index greater than a refractive index of the first insulator, and
   the second insulator and the lens member are integrally formed.

2. The transmissive-type liquid crystal display device according to claim 1, wherein
   the third insulator has a refractive index lower than the refractive index of the second insulator, and has transmissivity.

3. The transmissive-type liquid crystal display device according to claim 1, wherein
   the light-shielding body is contained in the first insulator in the plan view.

4. An electronic apparatus comprising:
   the transmissive-type liquid crystal display device according to claim 1.

5. The transmissive-type liquid crystal display device according to claim 1, wherein
   the light-shielding body includes a light-shielding region having light-shielding properties, and
   the second insulator is provided in an opening region surrounded by the light-shielding region in plan view.

* * * * *